US008863857B2

(12) United States Patent
Bassett

(10) Patent No.: US 8,863,857 B2
(45) Date of Patent: Oct. 21, 2014

(54) ROW UNIT FOR AGRICULTURAL IMPLEMENT

(75) Inventor: Joseph D. Bassett, Sycamore, IL (US)

(73) Assignee: Dawn Equipment Company, Sycamore, IL (US)

( * ) Notice: Subject to any disclaimer, the term of this patent is extended or adjusted under 35 U.S.C. 154(b) by 242 days.

(21) Appl. No.: 13/402,688

(22) Filed: Feb. 22, 2012

(65) Prior Publication Data
US 2012/0210920 A1 Aug. 23, 2012

Related U.S. Application Data

(60) Provisional application No. 61/445,784, filed on Feb. 23, 2011.

(51) Int. Cl.
*A01C 5/06* (2006.01)
*A01C 7/20* (2006.01)

(52) U.S. Cl.
CPC .. *A01C 7/205* (2013.01); *A01C 5/06* (2013.01)
USPC ................. 172/2; 172/763; 172/773; 111/55; 111/62; 111/136; 111/167

(58) Field of Classification Search
CPC .................................. A01C 5/06; A01C 7/205
USPC .......... 172/2, 4, 763, 773; 111/52, 54, 55, 62, 111/136, 167
See application file for complete search history.

(56) References Cited

U.S. PATENT DOCUMENTS

| 114,002 A | 4/1871 | Godfrey |
| 353,491 A | 2/1886 | Wells |

(Continued)

FOREIGN PATENT DOCUMENTS

| BE | 551372 | 10/1956 |
| CA | 530673 | 9/1956 |

(Continued)

OTHER PUBLICATIONS

Exner, Rick, "*Sustainable Agriculture: Practical Farmers of Iowa Reducing Weed Pressure in Ridge-Till*," Iowa State University University Extension, http://www.extension.iastate.edu/Publications/SA2.pdf, Jul. 1992, Reviewed Jul. 2009, Retrieved Nov. 2, 2012 (4 pages).

(Continued)

*Primary Examiner* — Christopher J Novosad
(74) *Attorney, Agent, or Firm* — Nixon Peabody LLP

(57) ABSTRACT

An agricultural row unit for use with a towing frame hitched to a tractor includes an attachment frame adapted to be rigidly connected to the towing frame, and a furrow-opening module comprising a first linkage pivotably coupled to the attachment frame, a first movable frame pivotably coupled to the linkage to permit vertical pivoting movement of the first movable frame relative to the linkage, a furrow-opening device mounted on the first movable frame, and a first biasing element pivotably attached to the linkage and coupled to the first movable frame for urging the furrow-opening device downwardly against the soil. The row unit also includes a furrow-closing module and a second biasing element for urging the at least one furrow-closing device downwardly against the soil.

16 Claims, 27 Drawing Sheets

(56) References Cited

U.S. PATENT DOCUMENTS

| | | | |
|---|---|---|---|
| 523,508 A | 7/1894 | Bauer et al. | |
| 736,369 A | 8/1903 | Dynes et al. | |
| 803,088 A | 10/1905 | Barker | |
| 1,134,462 A | 4/1915 | Kendrick | |
| 1,158,023 A | 10/1915 | Beaver | |
| 1,247,744 A | 11/1917 | Trimble | |
| 1,260,752 A | 3/1918 | Casaday | |
| 1,321,040 A | 11/1919 | Hoffman | |
| 1,391,593 A | 9/1921 | Sweeting | |
| 1,398,668 A | 11/1921 | Bordsen | |
| 1,481,981 A | 1/1924 | Boye | |
| 1,791,462 A | 2/1931 | Bermel | |
| 1,901,299 A | 3/1933 | Johnson | |
| 1,901,778 A | 3/1933 | Schlag | |
| 2,014,334 A | 9/1935 | Johnson | |
| 2,058,539 A | 10/1936 | Welty et al. | |
| 2,269,051 A | 1/1942 | Cahoy | |
| 2,341,143 A | 2/1944 | Herr | |
| 2,505,276 A | 4/1950 | Boroski | |
| 2,561,763 A | 7/1951 | Waters et al. | |
| 2,593,176 A | 4/1952 | Patterson | |
| 2,611,306 A | 9/1952 | Strehlow et al. | |
| 2,612,827 A | 10/1952 | Baggette et al. | |
| 2,691,353 A | 10/1954 | Secondo | |
| 2,692,544 A | 10/1954 | Jessup | |
| 2,715,286 A | 8/1955 | Saveson | |
| 2,754,622 A | 7/1956 | Rohnert | |
| 2,771,044 A | 11/1956 | Putifer | |
| 2,773,343 A | 12/1956 | Oppel | |
| 2,777,373 A | 1/1957 | Pursche | |
| 2,799,234 A | 7/1957 | Chancey | |
| 2,805,574 A | 9/1957 | Jackson, Jr. et al. | |
| 2,925,872 A | 2/1960 | Darnell | |
| 2,960,358 A | 11/1960 | Christison | |
| 3,010,744 A | 11/1961 | Hollis | |
| 3,014,547 A | 12/1961 | Van der Lely | |
| 3,038,424 A | 6/1962 | Johnson | |
| 3,042,121 A | 7/1962 | Broetzman et al. | |
| 3,057,092 A | 10/1962 | Curlett | |
| 3,058,243 A | 10/1962 | McGee | |
| 3,065,879 A | 11/1962 | Jennings et al. | |
| 3,110,973 A | 11/1963 | Reynolds | |
| 3,122,901 A | 3/1964 | Thompson | |
| 3,123,152 A | 3/1964 | Biskis | |
| 3,188,989 A | 6/1965 | Johnston | |
| 3,213,514 A | 10/1965 | Evans | |
| 3,250,109 A | 5/1966 | Spyridakis | |
| 3,314,278 A | 4/1967 | Bergman | |
| 3,319,589 A | 5/1967 | Moran | |
| 3,351,139 A | 11/1967 | Schmitz et al. | |
| 3,355,930 A | 12/1967 | Fedorov | |
| 3,370,450 A | 2/1968 | Scheucher | |
| 3,420,273 A | 1/1969 | Greer | |
| 3,447,495 A | 6/1969 | Miller et al. | |
| 3,539,020 A | 11/1970 | Andersson et al. | 74/527 |
| 3,543,603 A | 12/1970 | Gley | 74/529 |
| 3,561,541 A | 2/1971 | Woelfel | 172/265 |
| 3,576,098 A | 4/1971 | Brewer | 56/295 |
| 3,581,685 A | 6/1971 | Taylor | 111/7 |
| 3,593,720 A | 7/1971 | Botterill et al. | 130/27 |
| 3,606,745 A | 9/1971 | Girodat | 56/20 |
| 3,635,495 A | 1/1972 | Orendorff | 280/415 |
| 3,653,446 A | 4/1972 | Kalmon | 172/4 |
| 3,701,327 A | 10/1972 | Krumholz | 111/81 |
| 3,708,019 A | 1/1973 | Ryan | 172/470 |
| 3,711,974 A | 1/1973 | Webb | 40/63 |
| 3,718,191 A | 2/1973 | Williams | 172/196 |
| 3,749,035 A | 7/1973 | Cayton et al. | 111/85 |
| 3,753,341 A | 8/1973 | Berg, Jr. et al. | 56/400.04 |
| 3,766,988 A | 10/1973 | Whitesides | 172/548 |
| 3,774,446 A | 11/1973 | Diehl | 73/194 |
| 3,906,814 A | 9/1975 | Magnussen | 74/483 PB |
| 3,939,846 A | 2/1976 | Drozhzhin et al. | 130/27 |
| 3,945,532 A | 3/1976 | Marks | 222/55 |
| 3,975,890 A | 8/1976 | Rodger | 56/208 |
| 4,009,668 A | 3/1977 | Brass et al. | 111/85 |
| 4,018,101 A | 4/1977 | Mihalic | 74/493 |
| 4,044,697 A | 8/1977 | Swanson | 111/66 |
| 4,055,126 A | 10/1977 | Brown et al. | 111/85 |
| 4,058,171 A | 11/1977 | van der Lely | 172/713 |
| 4,063,597 A | 12/1977 | Day | 172/126 |
| 4,096,730 A | 6/1978 | Martin | 72/352 |
| 4,099,576 A | 7/1978 | Jilani | 172/555 |
| 4,122,715 A | 10/1978 | Yokoyama et al. | 73/228 |
| 4,129,082 A | 12/1978 | Betulius | 111/7 |
| 4,141,200 A | 2/1979 | Johnson | 56/10.2 |
| 4,141,302 A | 2/1979 | Morrison, Jr. et al. | 111/52 |
| 4,141,676 A | 2/1979 | Jannen et al. | 417/539 |
| 4,142,589 A | 3/1979 | Schlagenhauf | 172/510 |
| 4,147,305 A | 4/1979 | Hunt | 239/167 |
| 4,149,475 A | 4/1979 | Bailey et al. | 111/66 |
| 4,157,661 A | 6/1979 | Schindel | 73/228 |
| 4,161,090 A | 7/1979 | Watts, Jr. | 52/301 |
| 4,173,259 A | 11/1979 | Heckenkamp | 172/10 |
| 4,182,099 A | 1/1980 | Davis et al. | 56/16.4 |
| 4,187,916 A | 2/1980 | Harden et al. | 172/146 |
| 4,191,262 A | 3/1980 | Sylvester | 172/459 |
| 4,196,567 A | 4/1980 | Davis et al. | 56/13.7 |
| 4,196,917 A | 4/1980 | Oakes et al. | 280/463 |
| 4,206,817 A | 6/1980 | Bowerman | 172/559 |
| 4,208,974 A | 6/1980 | Dreyer et al. | 111/85 |
| 4,213,408 A | 7/1980 | West et al. | 111/85 |
| 4,225,191 A | 9/1980 | Knoski | 301/9 |
| 4,233,803 A | 11/1980 | Davis et al. | 56/14.9 |
| 4,241,674 A | 12/1980 | Mellinger | 111/52 |
| 4,280,419 A | 7/1981 | Fischer | 111/80 |
| 4,295,532 A | 10/1981 | Williams et al. | 172/184 |
| 4,301,870 A | 11/1981 | Carre et al. | 172/7 |
| 4,307,674 A | 12/1981 | Jennings et al. | 111/85 |
| 4,311,104 A | 1/1982 | Steilen et al. | 111/85 |
| 4,317,355 A | 3/1982 | Hatsuno et al. | 72/342 |
| 4,359,101 A | 11/1982 | Gagnon | 172/38 |
| 4,375,837 A | 3/1983 | van der Lely et al. | 172/68 |
| 4,377,979 A | 3/1983 | Peterson et al. | 111/52 |
| 4,407,371 A | 10/1983 | Hohl | 172/253 |
| 4,430,952 A | 2/1984 | Murray | 111/85 |
| 4,433,568 A | 2/1984 | Kondo | 72/356 |
| 4,438,710 A | 3/1984 | Paladino | 111/3 |
| 4,445,445 A | 5/1984 | Sterrett | 111/7 |
| 4,461,355 A | 7/1984 | Peterson et al. | 172/156 |
| 4,481,830 A | 11/1984 | Smith et al. | 73/861.71 |
| 4,499,775 A | 2/1985 | Lasoen | 73/862.57 |
| 4,506,610 A | 3/1985 | Neal | 111/87 |
| 4,508,178 A | 4/1985 | Cowell et al. | 172/239 |
| 4,528,920 A | 7/1985 | Neumeyer | 111/85 |
| 4,530,405 A | 7/1985 | White | 172/126 |
| 4,537,262 A | 8/1985 | van der Lely | 172/146 |
| 4,538,688 A | 9/1985 | Szucs et al. | 172/555 |
| 4,550,122 A | 10/1985 | David et al. | 172/158 |
| 4,553,607 A | 11/1985 | Behn et al. | 172/156 |
| 4,580,506 A | 4/1986 | Fleischer et al. | 111/7 |
| 4,596,200 A | 6/1986 | Gafford et al. | 111/85 |
| 4,603,746 A | 8/1986 | Swales | 172/559 |
| 4,604,906 A | 8/1986 | Scarpa | 73/861.74 |
| 4,630,773 A | 12/1986 | Ortlip | 239/1 |
| 4,643,043 A | 2/1987 | Furuta et al. | 74/503 |
| 4,646,620 A | 3/1987 | Buchl | 91/1 |
| 4,650,005 A | 3/1987 | Tebben | 172/430 |
| 4,669,550 A | 6/1987 | Sittre | 172/559 |
| 4,671,193 A | 6/1987 | States | 111/73 |
| 4,674,578 A | 6/1987 | Bexten et al. | 172/126 |
| 4,703,809 A | 11/1987 | Van den Ende | 172/147 |
| 4,726,304 A | 2/1988 | Dreyer et al. | 111/73 |
| 4,738,461 A | 4/1988 | Stephenson et al. | 280/400 |
| 4,744,316 A | 5/1988 | Lienemann et al. | 111/69 |
| 4,762,075 A | 8/1988 | Halford | 111/73 |
| 4,765,190 A | 8/1988 | Strubbe | 73/861.72 |
| 4,768,387 A | 9/1988 | Kemp et al. | 73/861.73 |
| 4,779,684 A | 10/1988 | Schultz | 171/62 |
| 4,785,890 A | 11/1988 | Martin | 172/29 |
| 4,825,957 A | 5/1989 | White et al. | 172/126 |
| 4,825,959 A | 5/1989 | Wilhelm | 172/720 |
| 4,920,901 A | 5/1990 | Pounds | 111/164 |
| 4,926,767 A | 5/1990 | Thomas | 111/187 |

(56) References Cited

U.S. PATENT DOCUMENTS

| | | | |
|---|---|---|---|
| 4,930,431 A | 6/1990 | Alexander | 111/164 |
| 4,986,367 A | 1/1991 | Kinzenbaw | 172/126 |
| 4,998,488 A | 3/1991 | Hansson | 111/187 |
| 5,015,997 A | 5/1991 | Strubbe | 340/684 |
| 5,027,525 A | 7/1991 | Haukaas | 33/624 |
| 5,033,397 A | 7/1991 | Colburn, Jr. | 111/118 |
| 5,065,632 A | 11/1991 | Reuter | 73/861.73 |
| 5,074,227 A | 12/1991 | Schwitters | |
| 5,076,180 A | 12/1991 | Schneider | 111/139 |
| 5,092,255 A | 3/1992 | Long et al. | 111/167 |
| 5,113,957 A | 5/1992 | Tamai et al. | 172/10 |
| 5,129,282 A | 7/1992 | Bassett et al. | 74/529 |
| 5,136,934 A | 8/1992 | Darby, Jr. | 100/125 |
| 5,190,112 A | 3/1993 | Johnston et al. | 172/245 |
| 5,234,060 A | 8/1993 | Carter | 172/413 |
| 5,240,080 A | 8/1993 | Bassett et al. | 172/740 |
| 5,255,617 A | 10/1993 | Williams et al. | 111/140 |
| 5,269,237 A | 12/1993 | Baker et al. | 111/121 |
| 5,282,389 A | 2/1994 | Faivre et al. | 73/861.73 |
| 5,285,854 A | 2/1994 | Thacker et al. | 172/176 |
| 5,333,694 A | 8/1994 | Roggenbuck et al. | 172/156 |
| 5,337,832 A | 8/1994 | Bassett | 172/504 |
| 5,341,754 A | 8/1994 | Winterton | 111/139 |
| 5,346,019 A | 9/1994 | Kinzenbaw et al. | 172/311 |
| 5,346,020 A | 9/1994 | Bassett | 172/540 |
| 5,349,911 A | 9/1994 | Holst et al. | 111/139 |
| 5,351,635 A | 10/1994 | Hulicsko | 111/135 |
| 5,379,847 A | 1/1995 | Snyder | 172/128 |
| 5,394,946 A | 3/1995 | Clifton et al. | 172/139 |
| 5,398,771 A | 3/1995 | Hornung et al. | 172/311 |
| 5,419,402 A | 5/1995 | Heintzman | 172/551 |
| 5,427,192 A | 6/1995 | Stephenson et al. | 180/53.1 |
| 5,443,023 A | 8/1995 | Carroll | 111/191 |
| 5,443,125 A | 8/1995 | Clark et al. | 172/608 |
| 5,461,995 A | 10/1995 | Winterton | 111/139 |
| 5,462,124 A | 10/1995 | Rawson | 172/569 |
| 5,473,999 A | 12/1995 | Rawson et al. | 111/127 |
| 5,477,682 A | 12/1995 | Tobiasz | 60/583 |
| 5,477,792 A | 12/1995 | Bassett et al. | 111/121 |
| 5,479,868 A | 1/1996 | Bassett | 111/139 |
| 5,479,992 A | 1/1996 | Bassett | 172/4 |
| 5,485,796 A | 1/1996 | Bassett | 111/33 |
| 5,485,886 A | 1/1996 | Bassett | 172/763 |
| 5,497,717 A | 3/1996 | Martin | 111/191 |
| 5,497,837 A | 3/1996 | Kehrney | 172/619 |
| 5,499,683 A | 3/1996 | Bassett | 172/4 |
| 5,499,685 A | 3/1996 | Downing, Jr. | 172/699 |
| 5,517,932 A | 5/1996 | Ott et al. | 111/193 |
| 5,524,525 A | 6/1996 | Nikkel et al. | 91/179 |
| 5,531,171 A | 7/1996 | Whitesel et al. | 111/140 |
| 5,542,362 A | 8/1996 | Bassett | 111/120 |
| 5,544,709 A | 8/1996 | Lowe et al. | 172/661 |
| 5,562,165 A | 10/1996 | Janelle et al. | 172/4 |
| 5,590,611 A | 1/1997 | Smith | 111/127 |
| 5,603,269 A | 2/1997 | Bassett | 111/52 |
| 5,623,997 A | 4/1997 | Rawson et al. | 172/156 |
| 5,640,914 A | 6/1997 | Rawson | 111/140 |
| 5,657,707 A | 8/1997 | Dresher et al. | 111/139 |
| 5,660,126 A | 8/1997 | Freed et al. | 111/140 |
| 5,685,245 A | 11/1997 | Bassett | 111/62 |
| 5,704,430 A | 1/1998 | Smith et al. | 172/29 |
| 5,709,271 A | 1/1998 | Bassett | 172/4 |
| 5,727,638 A | 3/1998 | Wodrich et al. | 172/414 |
| 5,852,982 A | 12/1998 | Peter | 111/118 |
| 5,868,207 A | 2/1999 | Langbakk et al. | 172/274 |
| 5,878,678 A | 3/1999 | Stephens et al. | 111/139 |
| RE36,243 E | 7/1999 | Rawson et al. | 111/121 |
| 5,970,891 A | 10/1999 | Schlagel | 111/135 |
| 5,970,892 A | 10/1999 | Wendling et al. | 111/139 |
| 5,988,293 A | 11/1999 | Brueggen et al. | 172/414 |
| 6,067,918 A | 5/2000 | Kirby | 111/121 |
| 6,164,385 A | 12/2000 | Buchl | 172/239 |
| 6,223,663 B1 | 5/2001 | Wendling et al. | 111/139 |
| 6,223,828 B1 | 5/2001 | Paulson et al. | 171/63 |
| 6,237,696 B1 | 5/2001 | Mayerle | 172/558 |
| 6,253,692 B1 | 7/2001 | Wendling et al. | 111/139 |
| 6,314,897 B1 | 11/2001 | Hagny | 111/192 |
| 6,325,156 B1 | 12/2001 | Barry | 172/518 |
| 6,330,922 B1 | 12/2001 | King | 172/166 |
| 6,331,142 B1 | 12/2001 | Bischoff | 460/112 |
| 6,343,661 B1 | 2/2002 | Thomspon et al. | 172/444 |
| 6,347,594 B1 | 2/2002 | Wendling et al. | 111/167 |
| 6,382,326 B1 | 5/2002 | Goins et al. | 172/239 |
| 6,389,999 B1 | 5/2002 | Duello | 111/200 |
| 6,453,832 B1 | 9/2002 | Schaffert | 111/150 |
| 6,454,019 B1 | 9/2002 | Prairie et al. | 172/677 |
| 6,460,623 B1 | 10/2002 | Knussman et al. | 172/4 |
| 6,516,595 B2 | 2/2003 | Rhody et al. | 56/10.2 E |
| 6,530,334 B2 | 3/2003 | Hagny | 111/189 |
| 6,575,104 B2 | 6/2003 | Brummelhuis | 111/139 |
| 6,644,224 B1 | 11/2003 | Bassett | 111/157 |
| 6,701,856 B1 | 3/2004 | Zoke et al. | 111/121 |
| 6,701,857 B1 | 3/2004 | Jensen et al. | 111/200 |
| 6,786,130 B2 | 9/2004 | Steinlage et al. | 91/390 |
| 6,827,029 B1 * | 12/2004 | Wendte | 111/185 |
| 6,834,598 B2 | 12/2004 | Jüptner | 111/140 |
| 6,840,853 B2 | 1/2005 | Foth | 460/111 |
| 6,886,650 B2 | 5/2005 | Bremmer | 180/89.13 |
| 6,889,943 B2 | 5/2005 | Dinh et al. | 248/34 |
| 6,912,963 B2 | 7/2005 | Bassett | 111/163 |
| 6,986,313 B2 | 1/2006 | Halford et al. | 111/186 |
| 6,997,400 B1 | 2/2006 | Hanna et al. | 239/383 |
| 7,004,090 B2 | 2/2006 | Swanson | 111/119 |
| 7,044,070 B2 | 5/2006 | Kaster et al. | 111/62 |
| 7,063,167 B1 | 6/2006 | Staszak et al. | 172/328 |
| 7,159,523 B2 | 1/2007 | Bourgault et al. | 111/187 |
| 7,222,575 B2 | 5/2007 | Bassett | 111/140 |
| 7,290,491 B2 | 11/2007 | Summach et al. | 111/181 |
| 7,360,494 B2 | 4/2008 | Martin | 111/164 |
| 7,360,495 B1 | 4/2008 | Martin | 111/164 |
| 7,438,006 B2 | 10/2008 | Mariman et al. | 111/164 |
| 7,451,712 B2 | 11/2008 | Bassett et al. | 111/140 |
| 7,523,709 B1 | 4/2009 | Kiest | 111/119 |
| 7,540,333 B2 | 6/2009 | Bettin et al. | 172/744 |
| 7,575,066 B2 | 8/2009 | Bauer | 172/540 |
| 7,584,707 B2 | 9/2009 | Sauder et al. | 111/140 |
| 7,665,539 B2 | 2/2010 | Bassett et al. | 172/540 |
| 7,673,570 B1 | 3/2010 | Bassett | 111/63 |
| 7,743,718 B2 | 6/2010 | Bassett | 111/135 |
| 7,870,827 B2 | 1/2011 | Bassett | 111/119 |
| 7,938,074 B2 | 5/2011 | Liu | 111/200 |
| 7,946,231 B2 | 5/2011 | Martin et al. | 111/60 |
| 8,380,356 B1 | 2/2013 | Zielke et al. | 700/284 |
| 8,386,137 B2 | 2/2013 | Sauder et al. | 701/50 |
| 8,393,407 B2 | 3/2013 | Freed | 172/551 |
| 8,408,149 B2 | 4/2013 | Rylander | 111/140 |
| 8,550,020 B2 | 10/2013 | Sauder et al. | 111/200 |
| 8,573,319 B1 | 11/2013 | Casper et al. | 172/4 |
| 8,634,992 B2 | 1/2014 | Sauder et al. | 701/50 |
| 2002/0162492 A1 | 11/2002 | Juptner | 111/140 |
| 2006/0102058 A1 | 5/2006 | Swanson | 111/119 |
| 2006/0191695 A1 | 8/2006 | Walker et al. | 172/452 |
| 2006/0237203 A1 | 10/2006 | Miskin | 172/799.5 |
| 2007/0044694 A1 | 3/2007 | Martin | 111/121 |
| 2007/0272134 A1 | 11/2007 | Baker et al. | 111/163 |
| 2008/0093093 A1 | 4/2008 | Sheppard et al. | 172/2 |
| 2008/0236461 A1 | 10/2008 | Sauder et al. | 111/170 |
| 2008/0256916 A1 | 10/2008 | Vaske et al. | 56/13.5 |
| 2010/0019471 A1 | 1/2010 | Ruckle et al. | 280/504 |
| 2010/0108336 A1 | 5/2010 | Thomson et al. | 172/795 |
| 2010/0154693 A1 | 6/2010 | Bassett | 111/123 |
| 2010/0180695 A1 | 7/2010 | Sauder et al. | 73/862.045 |
| 2010/0198529 A1 | 8/2010 | Sauder et al. | 702/41 |
| 2010/0282480 A1 | 11/2010 | Breker et al. | 172/170 |
| 2010/0300710 A1 | 12/2010 | Bassett | 172/1 |
| 2011/0036602 A1 | 2/2011 | Bassett | 172/1 |
| 2011/0088603 A1 | 4/2011 | Bassett | 111/121 |
| 2011/0247537 A1 | 10/2011 | Freed | 111/140 |
| 2011/0313575 A1 | 12/2011 | Kowalchuk et al. | 700/282 |
| 2012/0060730 A1 | 3/2012 | Bassett | 111/149 |
| 2012/0060731 A1 | 3/2012 | Bassett | 111/149 |
| 2012/0186216 A1 | 7/2012 | Vaske et al. | 56/367 |
| 2012/0216731 A1 | 8/2012 | Schilling et al. | 111/69 |
| 2012/0232691 A1 | 9/2012 | Green et al. | 700/231 |

(56) References Cited

U.S. PATENT DOCUMENTS

| | | | |
|---|---|---|---|
| 2012/0255475 A1 | 10/2012 | Mariman et al. | 111/149 |
| 2013/0032363 A1 | 2/2013 | Curry et al. | 172/4 |
| 2013/0112121 A1 | 5/2013 | Achen et al. | 111/14 |
| 2013/0112124 A1 | 5/2013 | Bergen et al. | 111/151 |
| 2014/0026748 A1 | 1/2014 | Stoller et al. | 91/418 |
| 2014/0034339 A1 | 2/2014 | Sauder et al. | 172/2 |
| 2014/0034343 A1 | 2/2014 | Sauder et al. | 172/664 |

FOREIGN PATENT DOCUMENTS

| | | | |
|---|---|---|---|
| DE | 335464 | 9/1921 | |
| DE | 1108971 | 6/1961 | |
| DE | 24 02 411 | 7/1975 | |
| EP | 2 497 348 A1 | 9/2012 | A01B 79/00 |
| GB | 1 574 412 | 9/1980 | 111/123 |
| GB | 2 056 238 A | 10/1982 | |
| JP | 54-57726 | 5/1979 | 74/529 |
| SU | 392897 | 8/1973 | |
| SU | 436778 | 7/1974 | |
| SU | 611201 | 6/1978 | 74/527 |
| SU | 625648 | 9/1978 | |
| SU | 1410884 A1 | 7/1988 | |
| SU | 1466674 | 3/1989 | 111/124 |
| WO | WO 2011/161140 A1 | 12/2011 | A01C 7/20 |
| WO | WO 2012/149367 A1 | 1/2012 | A01C 5/00 |
| WO | WO 2012/149415 A1 | 1/2012 | A01B 63/111 |
| WO | WO 2012/167244 A1 | 12/2012 | A01B 5/00 |
| WO | WO 2013/025898 A1 | 2/2013 | B60C 23/02 |

OTHER PUBLICATIONS

Yetter 2010 Product Catalog, date estimated as early as Jan. 2010 (2 pages).

Yetter Cut and Move Manual, Sep. 2010 (28 pages).

John Deere, Seat Catalog, date estimated as early Sep. 2011 (19 pages).

Vogt, Willie, "*Revisiting Robotics*," http://m.farmindustrynews.com/farm-equipment/revisiting-robotics, Dec. 19, 2013 (3 pages).

John Deere, New Semi-Active Sea Suspension, http://www.deere.com/en_US/parts/agparts/semiactiveseat.html, date estimated as early as Jan. 2014, retrieved Feb. 6, 2014 (2 pages).

Case Corporation Brochure, Planters 900 Series Units/Modules Product Information, Aug. 1986 (4 pages).

Buffalo Farm Equipment All Flex Cultivator Operator Manual, Apr. 1990 (7 pages).

Shivvers, Moisture Trac 3000 Brochure, Aug. 21, 1990 (5 pages).

The New Farm, "*New Efficiencies in Nitrogen Application*," Feb. 1991, p. 6 (1 page).

Hiniker Company, Flow & Acreage Continuous Tracking System Monitor Demonstration Manuel, date estimated as early as Feb. 1991 (7 pages).

Russnogle, John, "*Sky Spy: Gulf War Technology Pinpoints Field and Yields*," Top Producer, A Farm Journal Publication, Nov. 1991, pp. 12-14 (4 pages).

Borgelt, Steven C., "*Sensor Technologies and Control Strategies for Managing Variability*," University of Missouri, Apr. 14-16, 1992 (15 pages).

Buffalo Farm Equipment Catalog on Models 4600, 4630, 4640, and 4620, date estimated as early as Feb. 1992 (4 pages).

Hiniker 5000 Cultivator Brochure, date estimated as early as Feb. 1992 (4 pages).

Hiniker Series 5000 Row Cultivator Rigid and Folding Toolbar Operator's Manual, date estimated as early as Feb. 1992 (5 pages).

Orthman Manufacturing, Inc., Rowcrop Cultivator Booklet, date estimated as early as Feb. 1992 (4 pages).

Yetter Catalog, date estimated as early as Feb. 1992 (4 pages).

Finck, Charlene, "*Listen to Your Soil*," Farm Journal Article, Jan. 1993, pp. 14-15 (2 pages).

Acu-Grain, "*Combine Yield Monitor 99% Accurate? 'You Bet Your Bushels*!!'" date estimated as early as Feb. 1993 (2 pages).

John Deere, New 4435 Hydro Row-Crop and Small-Grain Combine, date estimated as early as Feb. 1993 (8 pages).

Vansichen, R. et al., "*Continuous Wheat Yield Measurement on a Combine*," date estimated as early as Feb. 1993 (5 pages).

Martin Industries, LLC Paired 13 Spading Closing Wheels Brochure, date estimated as early as Jun. 6, 2012, pp. 18-25 (8 pages).

\* cited by examiner

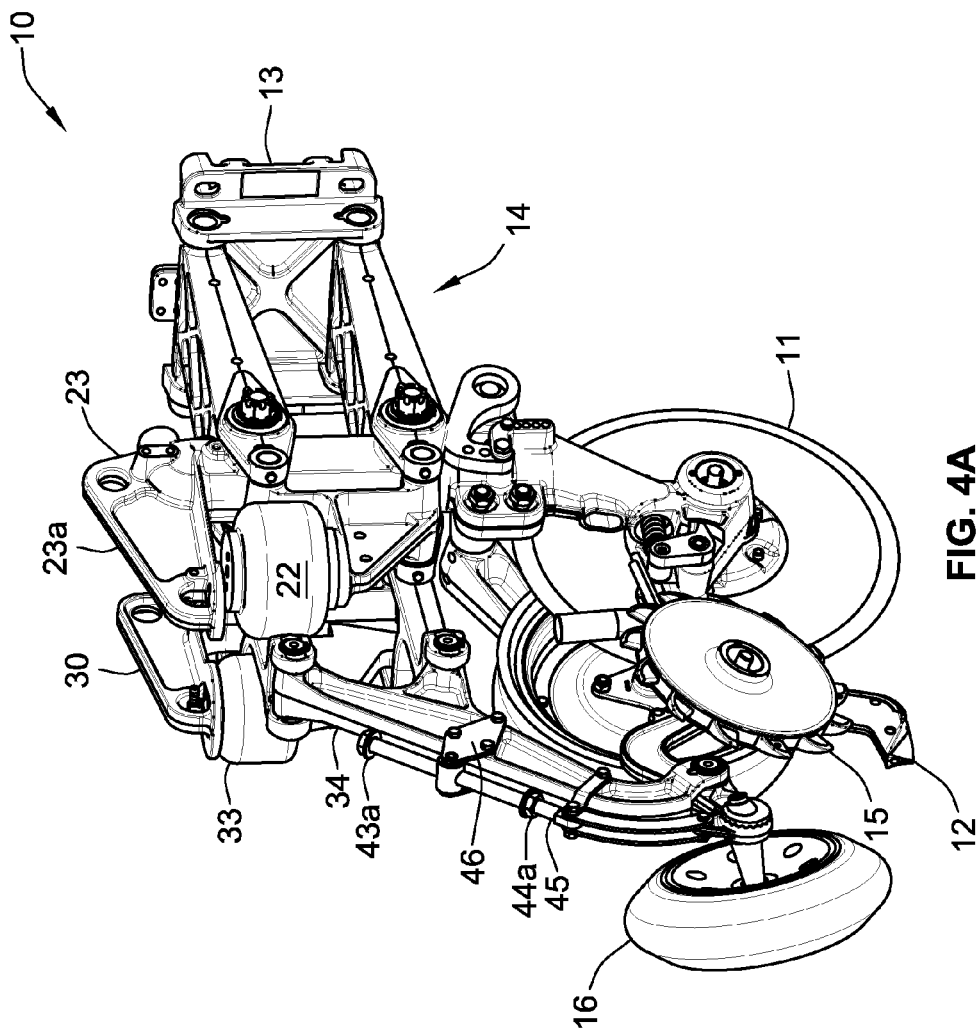

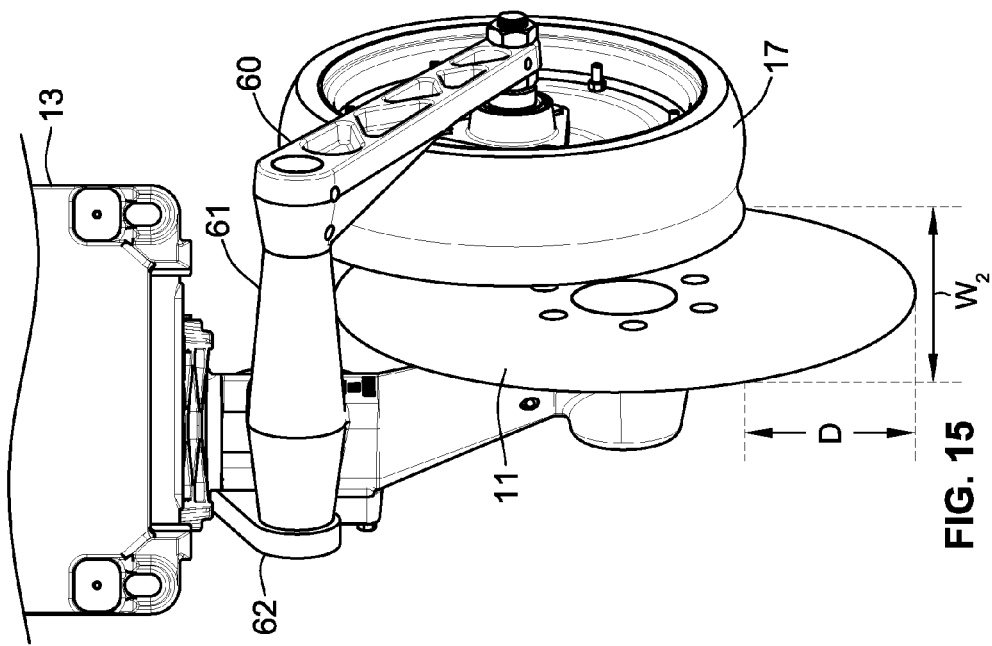
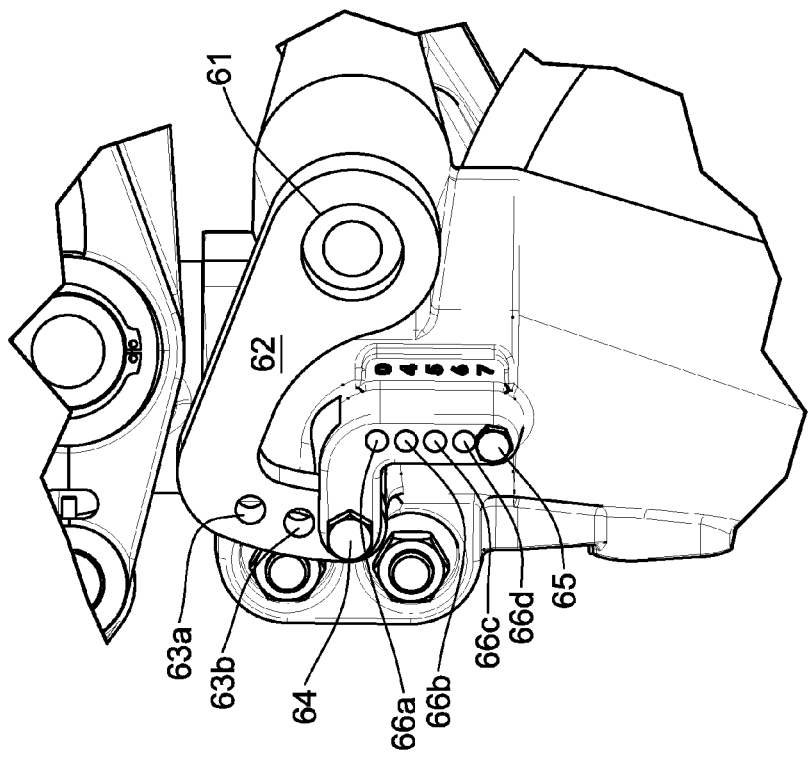
FIG. 15
FIG. 14

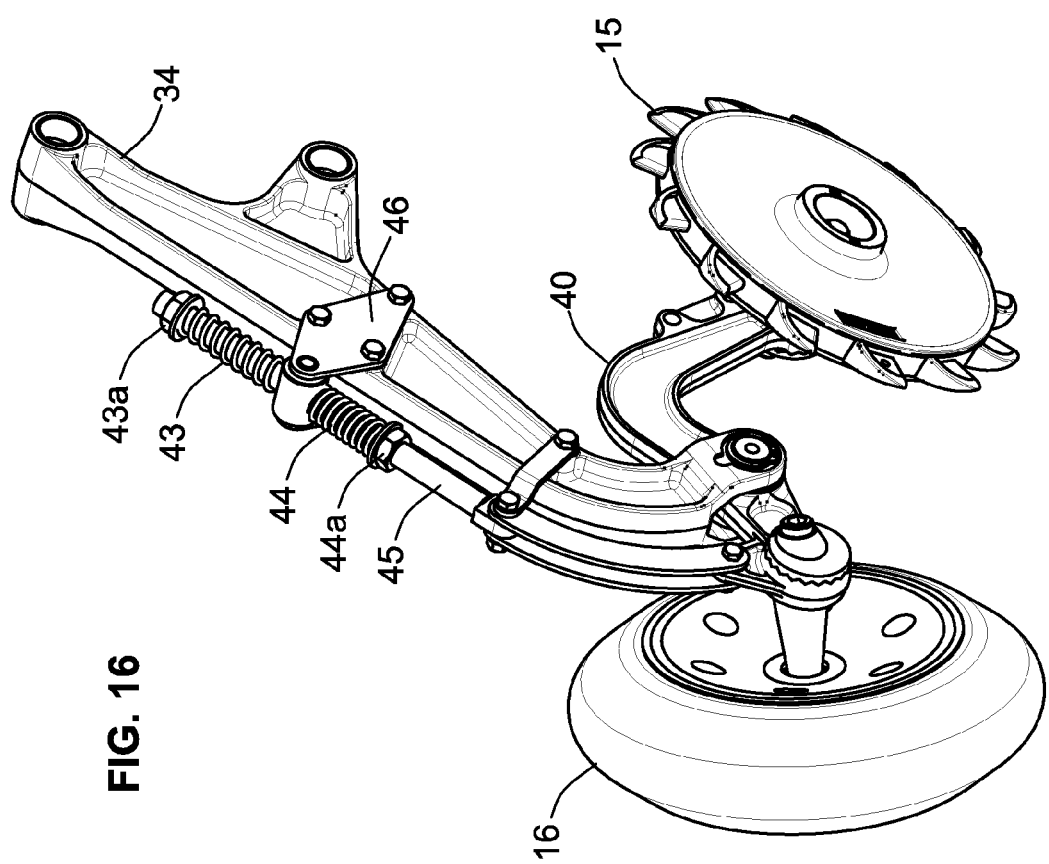

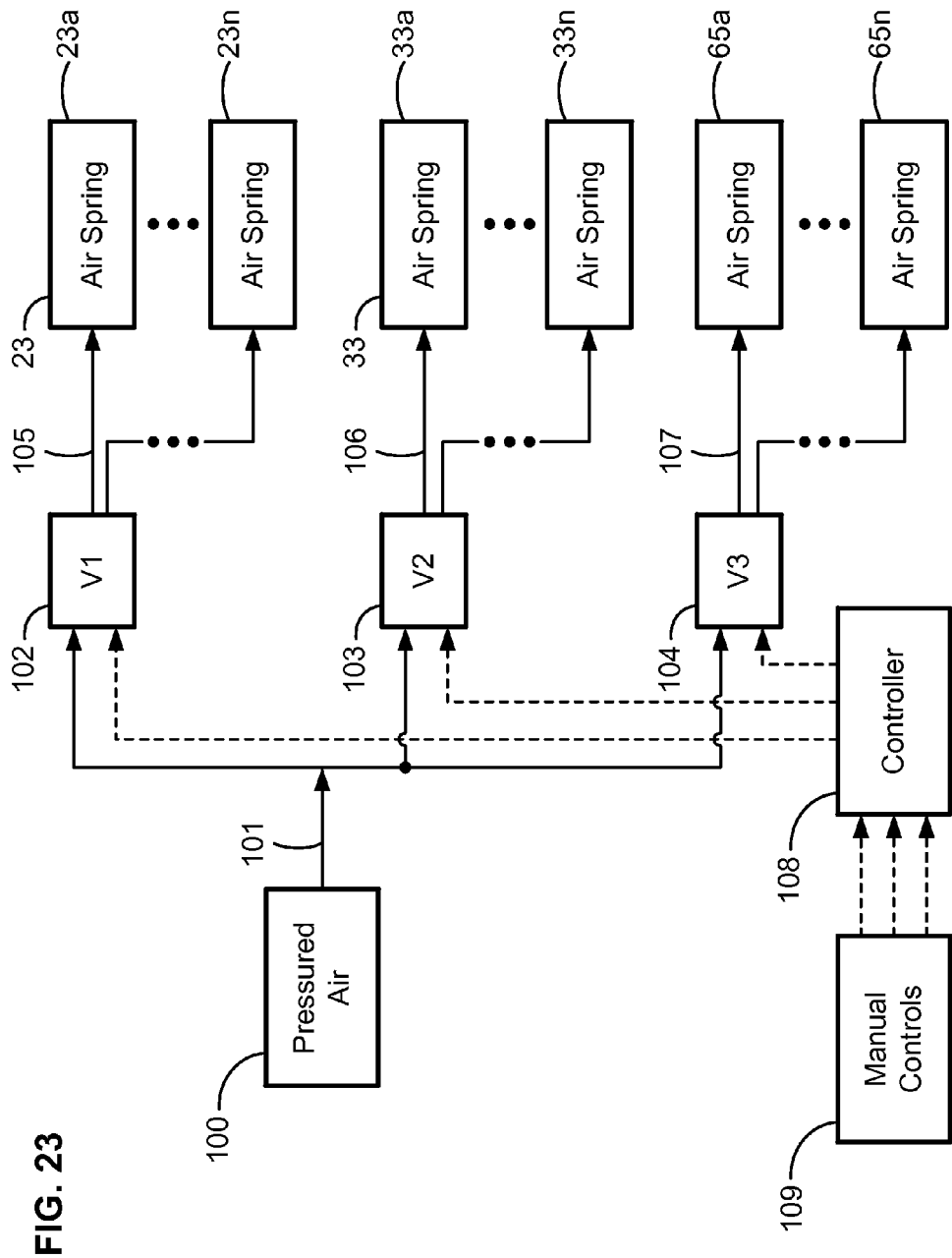

ROW UNIT FOR AGRICULTURAL IMPLEMENT

RELATED APPLICATIONS

This application is related to and claims priority to U.S. Provisional Patent Application Ser. No. 61/445,784, filed Feb. 23, 2011, which is incorporated herein in its entirety.

FIELD OF THE INVENTION

The present invention relates generally to agricultural implements and, more particularly, to an agricultural row unit for use with agricultural implements used for fertilizing and/or planting.

BACKGROUND OF THE INVENTION

As an agricultural planter row unit travels across fields with variable soil types, soil moisture, residue levels and topography, it is difficult to maintain a constant depth of fertilizer and/or seed due to the changing conditions. This problem is complicated by the fact that the optimum pressure for any given soil condition can be different for different implements carried by the same row unit. For example, hard soil might require increasing the down pressure of the soil-opening implement more than the down pressure of residue-clearing devices and closing implements carried on the same row unit. On the other hand, farming with higher residue levels may require greater increases in the down pressures for the row-clearing devices than for the opening and closing implements.

As computers and GPS systems have allowed crop production to be managed in a location-specific way as an implement moves through a field, it has become necessary to achieve more rapid changes in the setting or adjustment of the various implements.

SUMMARY OF THE INVENTION

In one embodiment, an agricultural row unit for use with a towing frame hitched to a tractor includes an attachment frame adapted to be rigidly connected to the towing frame, and a furrow-opening module comprising a first linkage pivotably coupled to the attachment frame, a first movable frame pivotably coupled to the linkage to permit vertical pivoting movement of the first movable frame relative to the linkage, a furrow-opening device mounted on the first movable frame, and a first biasing element pivotably attached to the linkage and coupled to the first movable frame for urging the furrow-opening device downwardly against the soil. The row unit also includes a furrow-closing module comprising a second linkage pivotably coupled to the first movable frame, a second movable frame pivotably coupled to the second linkage to permit vertical pivoting movement of the second movable frame relative to the second linkage, at least one furrow-closing device mounted on the second movable frame, and a second biasing element pivotably attached to the second linkage and coupled to the second movable frame for urging the at least one furrow-closing device downwardly against the soil. The linkages are preferably parallel linkages, and the second linkage is preferably laterally offset from the first linkage.

In one implementation, the first and second biasing elements are remotely controllable to permit adjustment of the forces produced to urge the furrow-opening and furrow-closing devices downwardly against the soil. At least one remote adjustment device, which may be manually or automatically operated, is coupled to at least one of the first and second biasing elements for adjusting the force produced by the at least one adjustment device. The first and second biasing elements may be responsive to a controllable fluid pressure, such as air springs.

In another implementation, the furrow-closing device comprises includes an equalizer bar having a pair of furrow-closing wheels mounted on opposite ends of the bar, and a support arm connecting the equalizer bar to the second movable frame. Manually adjustable biasing elements may apply an adjustable biasing force to one end of the equalizer bar, preferably permitting independent adjustment of the biasing force in opposite directions.

One embodiment of the second movable frame includes a stop mechanism coupled to the second linkage for limiting the range of pivoting movement of the second linkage. The stop mechanism may be movable between a limiting position for limiting the range of pivoting movement of the second linkage, and a locking position for locking the second linkage at a fixed elevation.

A modified embodiment of the row unit includes a third linkage pivotably coupled to the second movable frame, a third movable frame pivotably coupled to the third linkage to permit vertical pivoting movement of the third movable frame relative to the third linkage, at least one soil-engaging device mounted on the third movable frame, and a third biasing element pivotably attached to the third linkage and coupled to the third movable frame for urging the at least one soil-engaging device downwardly against the soil. The third biasing element may be remotely controllable to permit adjustment of the forces produced to urge the soil-engaging device(s) downwardly against the soil, and the soil engaging-device may be a pair of residue-clearing wheels.

In one implementation, an adjustment mechanism coupled to at least one of the closing wheels for adjusting the angle of tilt of the at least one closing wheel, the adjustment mechanism comprising a closing-wheel support that includes a ball joint for adjusting the angle of the axis of rotation of the at least one closing wheel, and an adjustable locking device coupled to the ball joint for locking the ball joint in a selected position.

BRIEF DESCRIPTION OF THE DRAWINGS

The invention may best be understood by reference to the following description taken in conjunction with the accompanying drawings, in which:

FIG. 4A is an exploded perspective of the row unit of FIG. 1.

FIG. 14 is a further enlarged side perspective view of the structure shown in FIG. 13.

FIG. 15 is an enlarged front perspective view of the gauge wheel and the opening disc in the row unit of FIGS. 1-14.

FIG. 16 is an enlarged rear perspective view of the closing wheel assembly in the row unit of FIGS. 1-14.

FIG. 23 is a block diagram of a pressurized air control system for controlling the three air springs included in the row unit shown in FIGS. 20-22.

DETAILED DESCRIPTION OF ILLUSTRATED EMBODIMENTS

Figure 1:
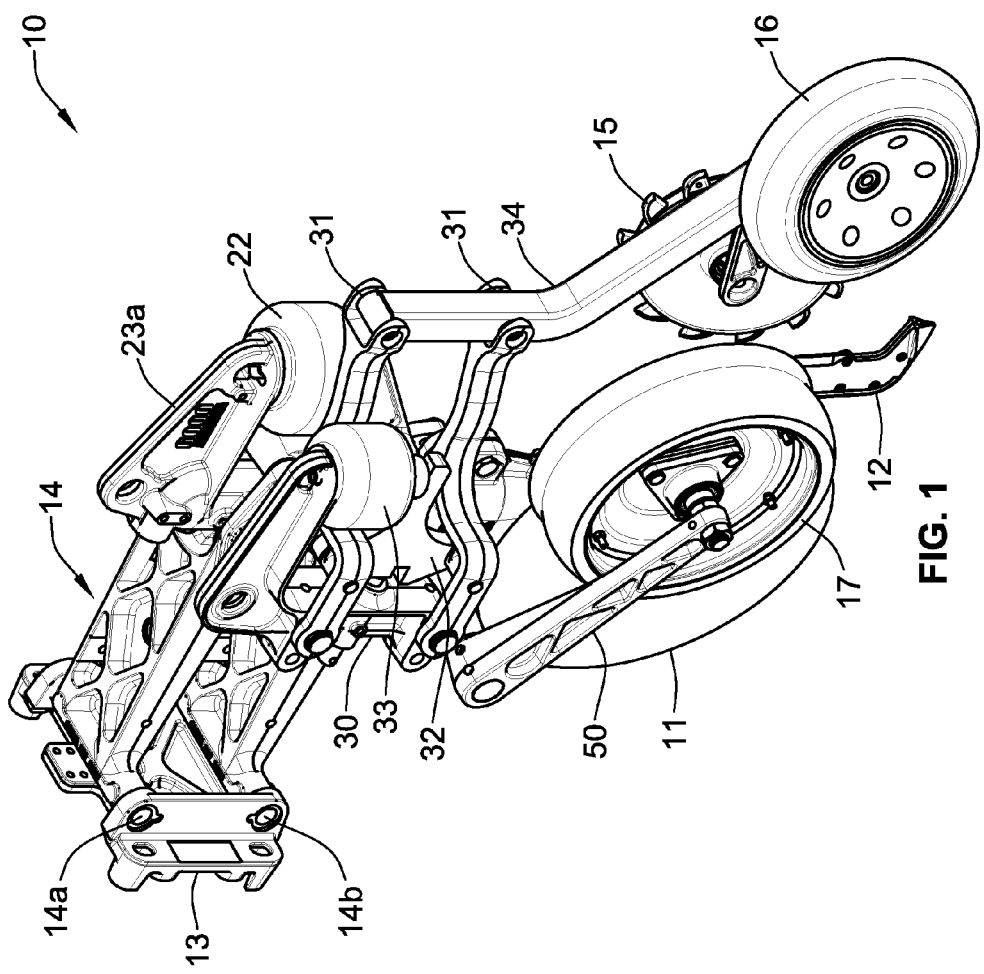
FIG. 1 is a perspective view of a row unit having a gauge wheel, an opening device, dispensing devices and closing devices.

Although the invention will be described in connection with certain preferred embodiments, it will be understood that the invention is not limited to those particular embodiments. On the contrary, the invention is intended to cover all alternatives, modifications, and equivalent arrangements as may be included within the spirit and scope of the invention as defined by the appended claims.

Turning now to the drawings and referring first to FIGS. 1-6, a row unit 10 includes a furrow-opening device 11 for forming a furrow, and at least one dispensing device 12 for depositing fertilizer and/or seed into the soil. In the illustrated embodiment, the furrow-opening device is a single tilted coulter wheel 11, but it will be understood that other furrow-opening devices may be used, such as a V-opener that is formed by a pair of tilted coulter wheels that converge at their lower ends. The front end of the row unit 10 includes a front attachment frame 13 adapted for connection to a conventional towing frame that is typically hitched to a tractor by a draw bar. The rear side of the attachment frame 13 is pivotably connected to the front end of a large linkage module that includes a parallel linkage 14 that is pivotably coupled to the frame 13 by a pair of rods 14a and 14b that pass through the linkage 14 and are attached at both ends to the frame 13.

As the row unit 10 is advanced by the tractor, the opener 11 penetrates the soil to form a furrow or seed slot. The dispensing device 12 deposits fertilizer into the furrow, and then the furrow is closed by distributing loosened soil back into the furrow with a pair of closing wheels 15 and 16. A gauge wheel 17 determines the depth of the furrow and the height of introduction of fertilizer, etc. Containers (not shown) on the row unit carry the fertilizer, seed and/or chemicals to be dispensed into the furrow.

Figure 2:
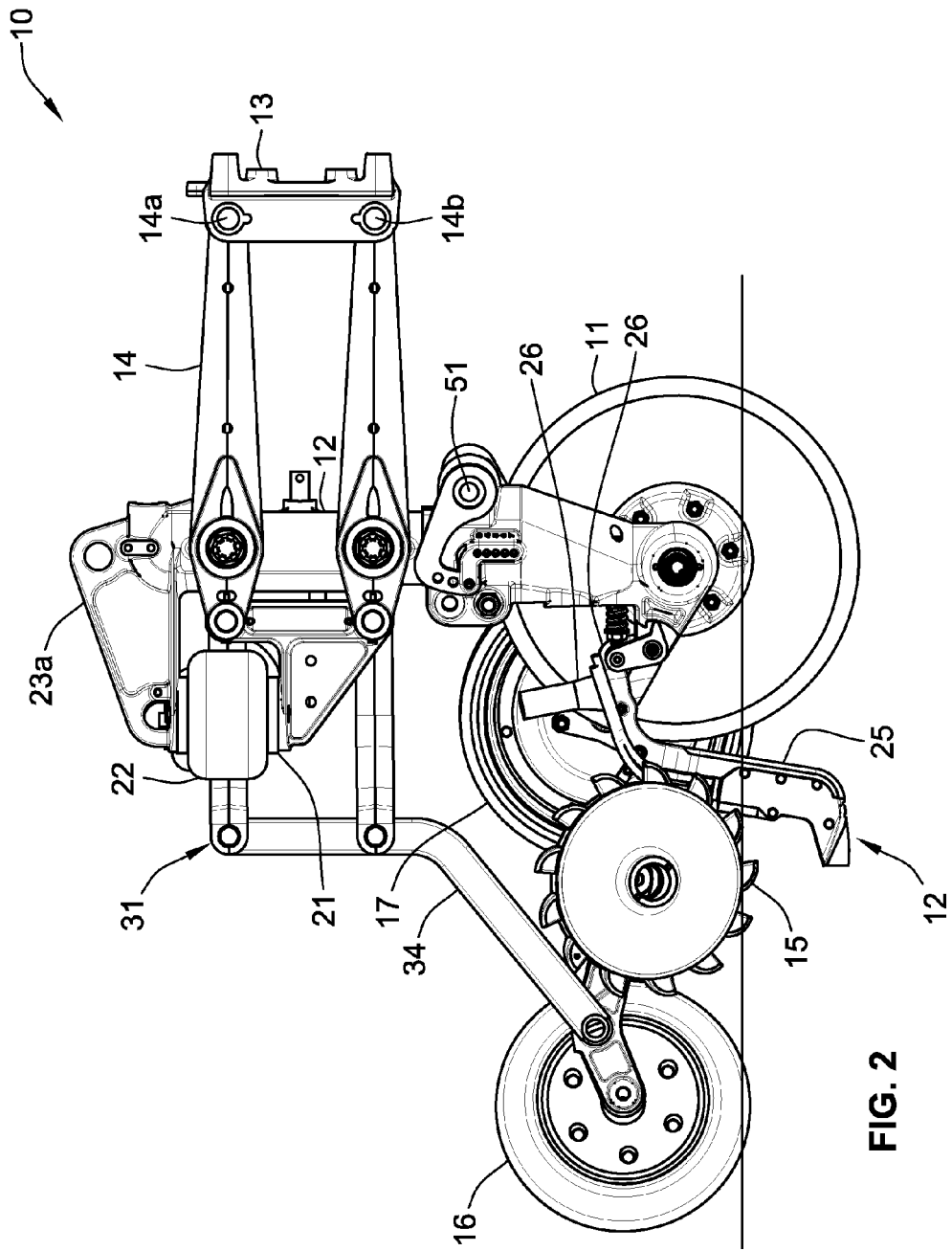
FIG. 2 is a side elevation of one side of the row unit of FIG. 1 with the linkage that connects the row unit to the towing frame, and the linkage that carries the closing devices, in level positions.
Figure 3:
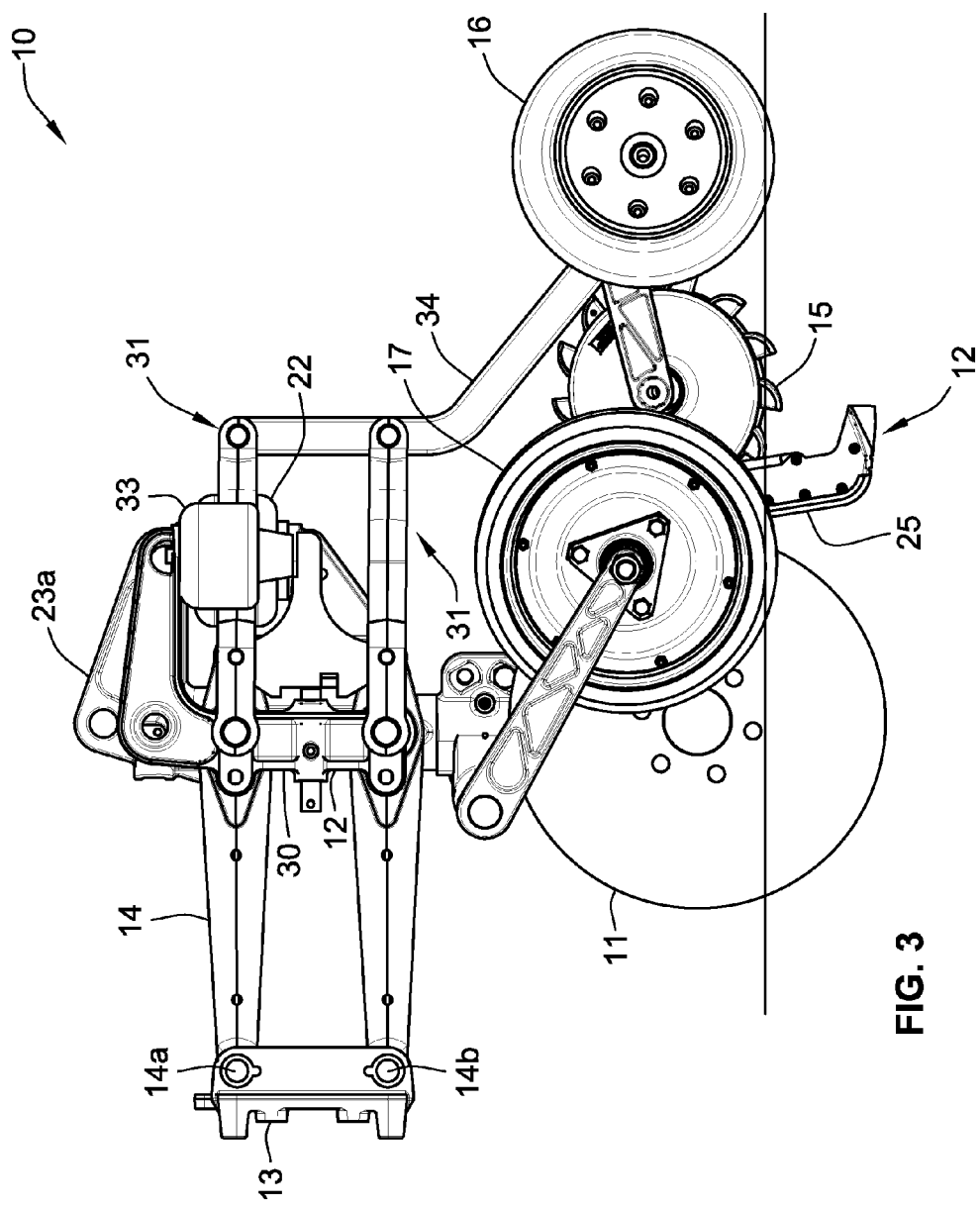
FIG. 3 is a side elevation of the opposite side of the row unit of FIG. 1 with the linkage that connects the row unit to the towing frame, and the linkage that carries the closing devices, in level positions.

The trailing end of the parallel linkage 14 is pivotably connected to a cradle 21, for a first air spring 22, by a pair of pins 21a and 21b (see FIG. 2). The upper end of the air spring 22 is attached to an arm 23a that is an integral part of a stem 23 that carries the opener 11, the dispensing device 12 and the gauge wheel 17. The stem 23 is attached to a pair of tubes 24a and 24b that are coupled at both ends to the parallel linkage 14 forwardly of the pins 21a, 21b (see FIG. 4D). When the air spring 22 is expanded by increasing the air pressure supplied to the spring, the downward pressure on the trailing end of the parallel linkage 14 is increased, which can (1) pivot that end of the linkage 14 downwardly around the axes of the pivotable connection between the linkage 14 and the front attachment frame 13 (see FIG. 5) and/or (2) increase the downward pressure on the stem 23 and, therefore, on the opener 11. Conversely, when the air spring 22 is contracted by reducing the air pressure supplied to the spring, the downward pressure on the stem 23 and the opener 11 is reduced, which can (1) pivot the trailing end of the linkage 14 upwardly around the axes of the pivotable connection between the linkage 14 and the front attachment frame 13 (see FIG. 7) and/or (2) decrease the downward pressure on the stem 23 and, therefore, on the opener 11. Thus, the downward pressure on the opener 11 may be remotely adjusted for different soil conditions by adjusting the air pressure supplied to the air spring 22.

Referring to FIG. 2, the dispensing device 12 includes both a fluid-delivery device 25 and a dry fertilizer delivery tube 26, both of which are mounted on a connector 27 attached to the stem 23. The upper end of the tube 26 is adapted for connection to a flexible tube that receives dry fertilizer from a conventional hopper (not shown) and conducts that fertilizer to the delivery tube 26. The lower end of the tube 26 is positioned far enough above the soil to clear common obstructions such as rocks, but close enough to the soil to direct the exiting dry fertilizer into the furrow formed by the opener 11.

The tube 26 is located in front of the fluid-delivery device 25 so that the dry fertilizer is delivered to the furrow while the furrow is wide open, i.e., well in front of the closing wheels 15 and 16 that close the furrow around the fluid-delivery device 25. The outer periphery of the front closing wheel 15 is spaced rearwardly from the outer periphery of the opening disc 11, which reduces the entrapment of debris between the opening disc 11 and the closing wheels 15, 16. One embodiment of the fluid delivery device 25 is described in detail in pending U.S. application Ser. No. 12/728,734, filed Mar. 22, 2010, and entitled "Agricultural Implement Having Fluid Delivery Features," which is incorporated herein by reference. Because the dry-fertilizer delivery tube 26 is mounted on the same connector 27 as the fluid-delivery device 25, the tube 26 follows the movements of the fluid-delivery device 25 as it tracks the furrow.

As can be seen in FIGS. 7-12, a closing wheel module includes a second parallel linkage 31 pivotably connected to a stem 30, a second cradle 32 carrying a second air spring 33, and a support arm 34 carrying the closing wheels 15 and 16. The stem 30 fits within a pair of forks formed by the leading end of the linkage 31 (see FIG. 9), and the stem 30 is pivotably connected to the linkage 31 by a pair of rods 30a and 30b that extend through the tubes 24a, 24b and the large linkage 14. A pair of nuts are threaded onto the ends of the rods 30a, 30b to hold everything together. The cradle 32 is pivotably coupled to the linkage 31 by a pair of pins 31a and 31b, and the trailing end of the linkage 31 is pivotably coupled to the support bar 34 by a pair of pins 34a and 34b.

Figure 7:
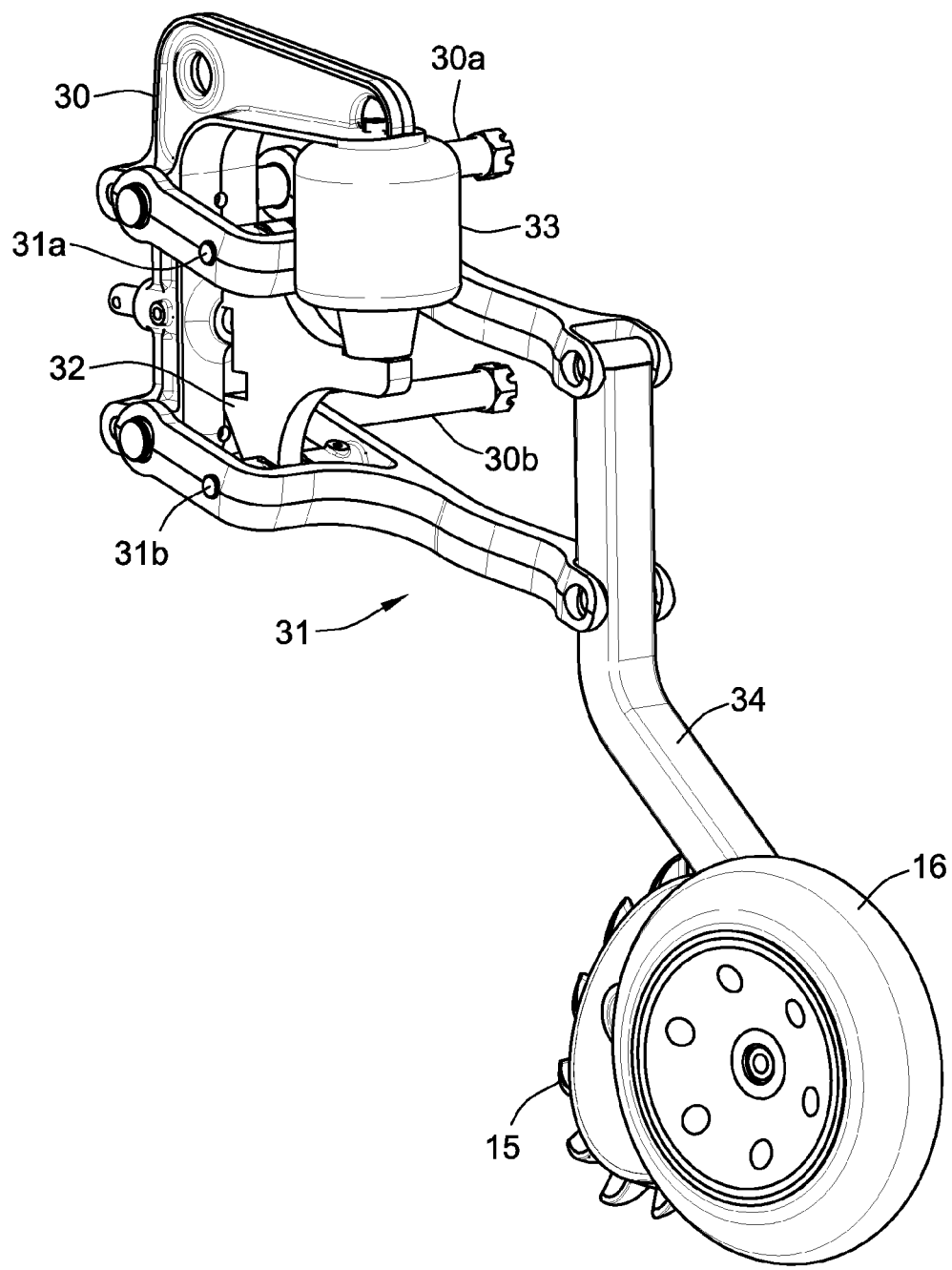
FIG. 7 is an enlarged perspective view of the closing device module in the row unit of FIG. 1 with the linkage that carries the closing devices in a lowered position.
Figure 8:
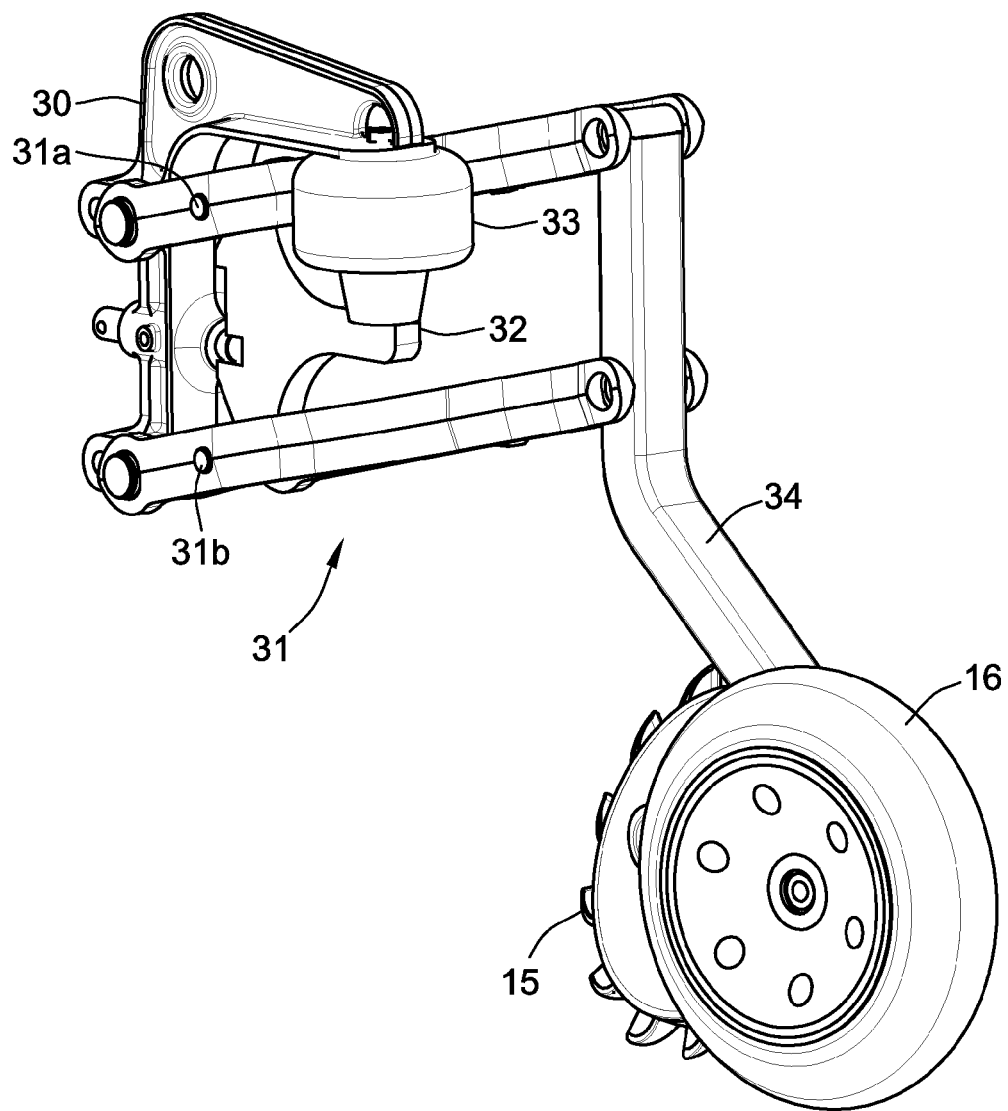
FIG. 8 is a perspective view of the same module shown in FIG. 7 with the linkage that carries the closing devices in a raised position.
Figure 9:
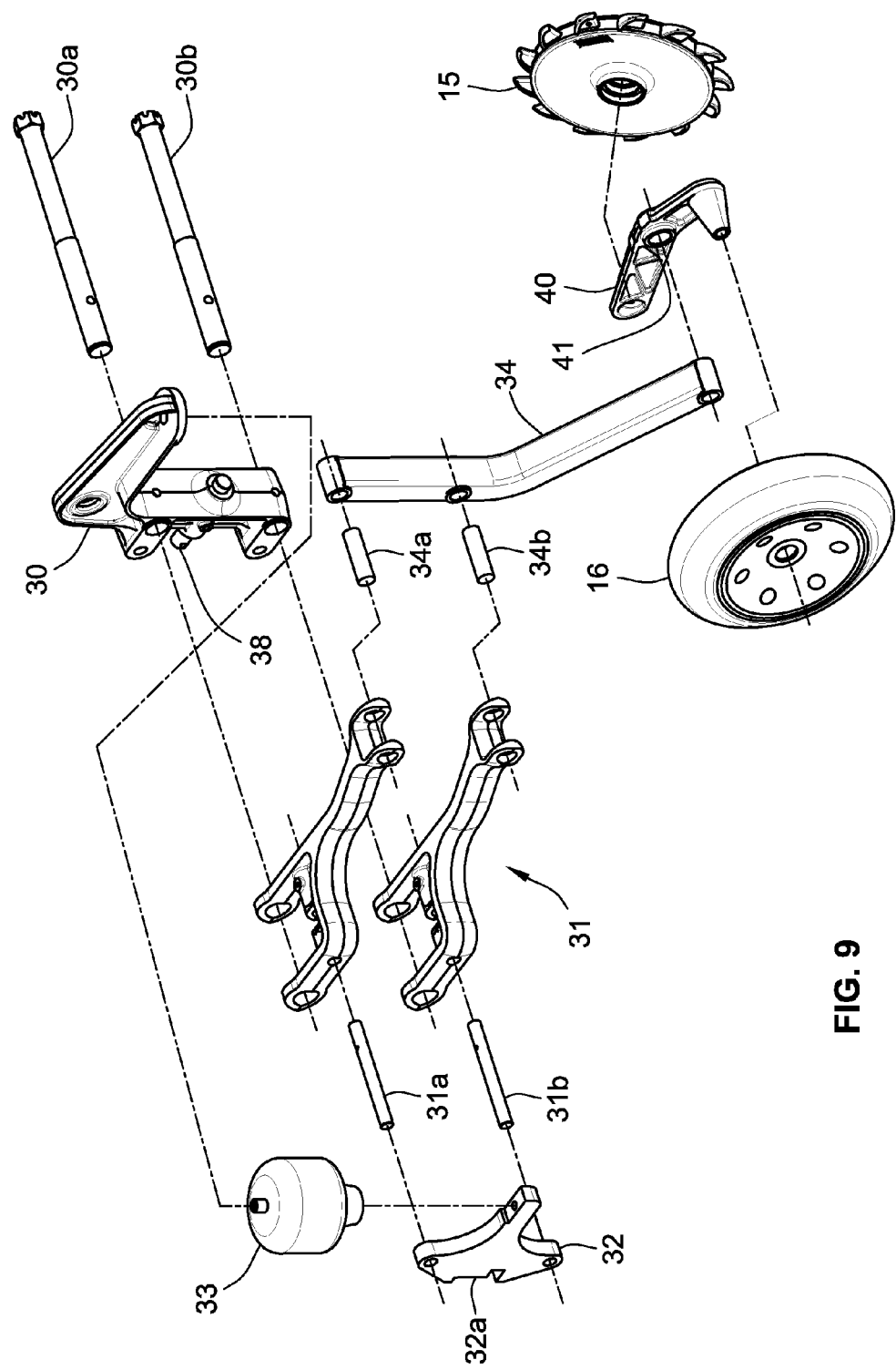
FIG. 9 is an exploded perspective view of the module shown in FIGS. 7 and 8.
Figure 10:
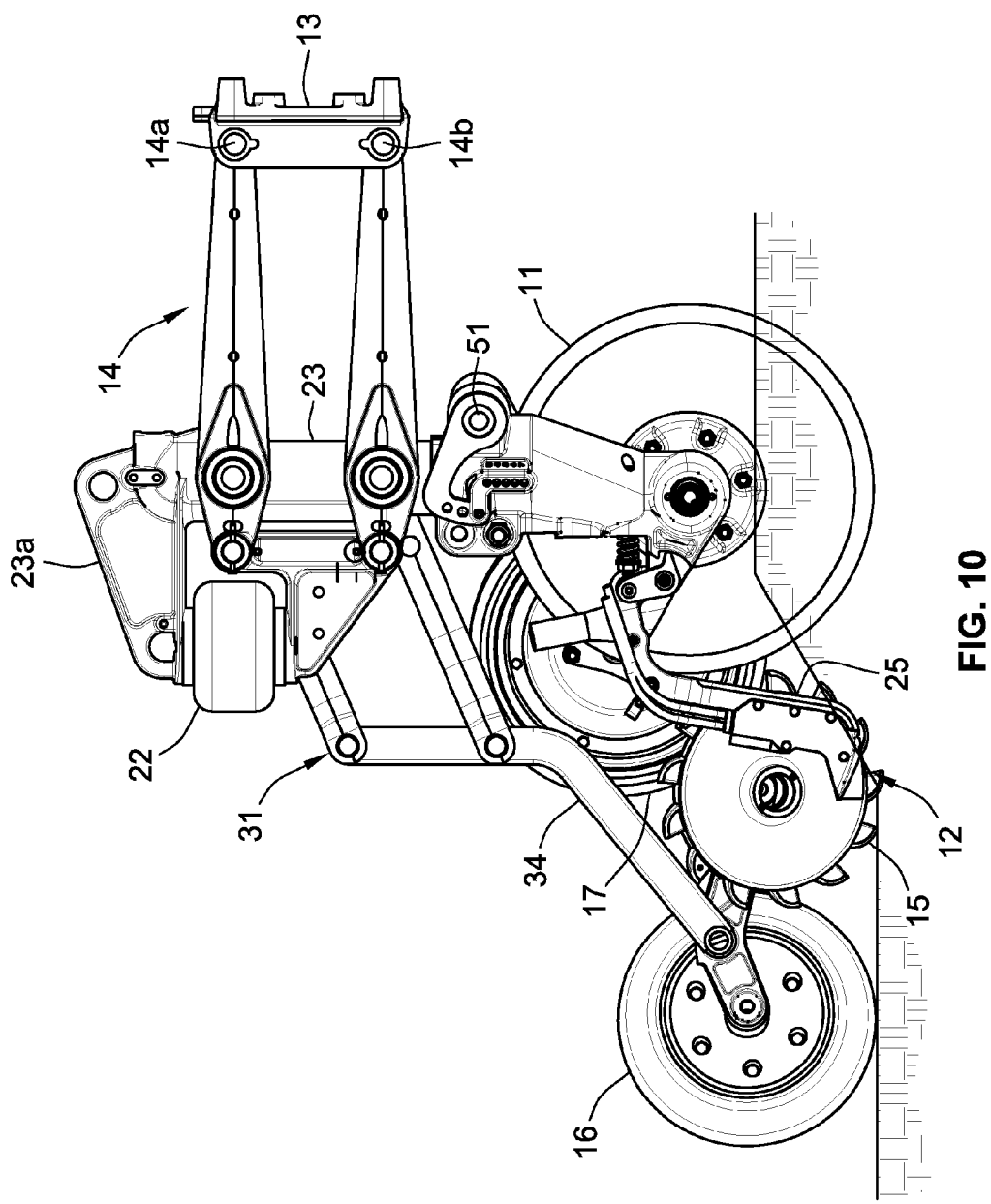
FIG. 10 is the same side elevation shown in FIG. 2 but with the linkage that carries the closing devices tilted downwardly to move the closing devices to a lowered position.
Figure 11:
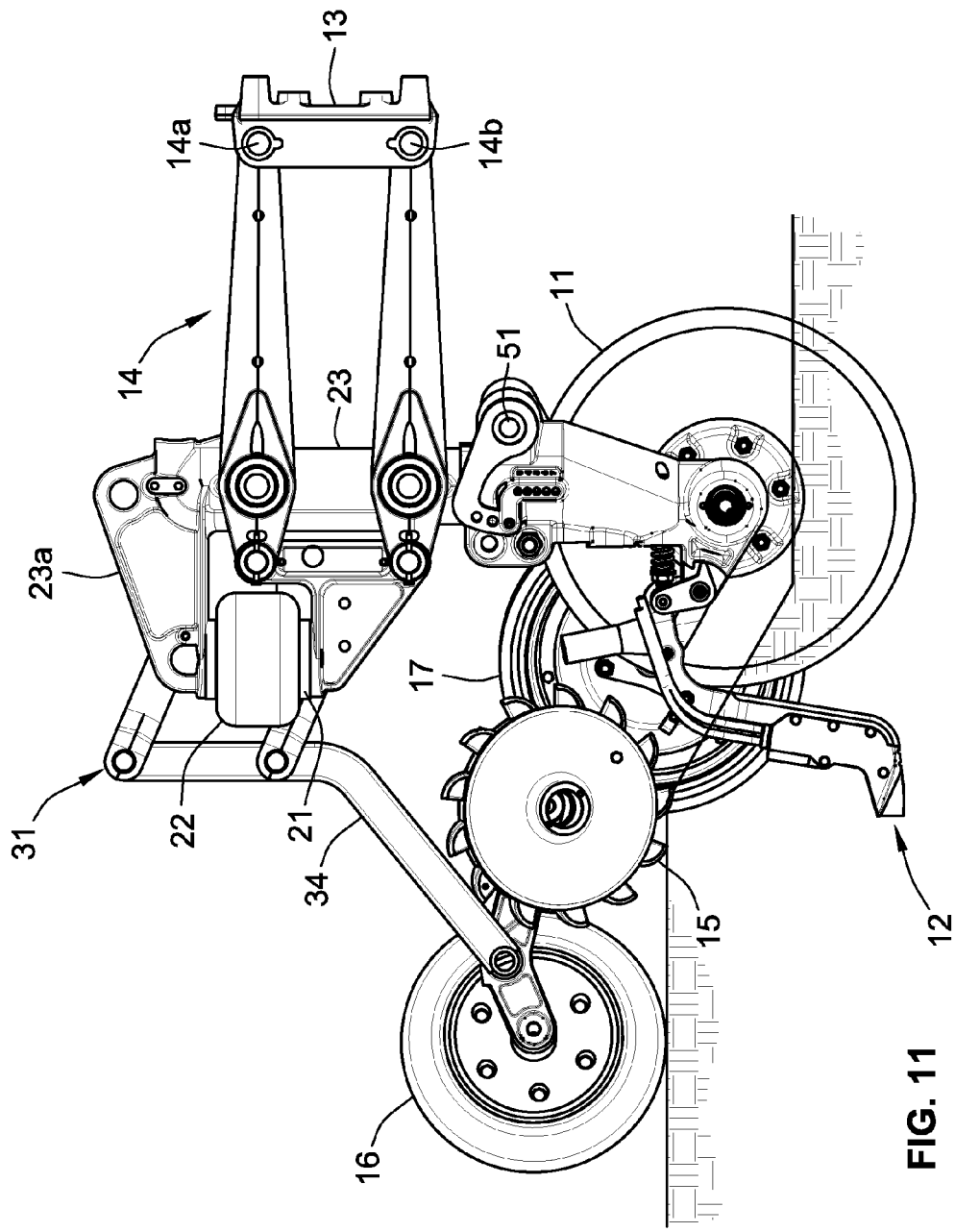
FIG. 11 is the same side elevation shown in FIG. 2 but with the linkage that carries the closing devices tilted upwardly to move the closing devices to a raised position.

When the air spring 33 is expanded by increasing the air pressure supplied to that spring, the downward pressure on the trailing end of the second parallel linkage 31 is increased, which can (1) pivot that end of the linkage 31 downwardly around the axes of the rods 30a, 30b, as depicted in FIGS. 7 and 10, and/or (2) increase the downward pressure on the support arm 34 and, therefore, on the closing wheels 15 and 16. Conversely, as depicted in FIG. 11, reducing the air pressure supplied to the air spring 33 reduces the downward pressure on the support arm 34 and the closing wheels 15 and 16. Thus, The downward pressure exerted on the closing wheels 15, 16 may be remotely adjusted for different soil conditions by adjusting the air pressure supplied to the air spring 33.

Figure 12A:
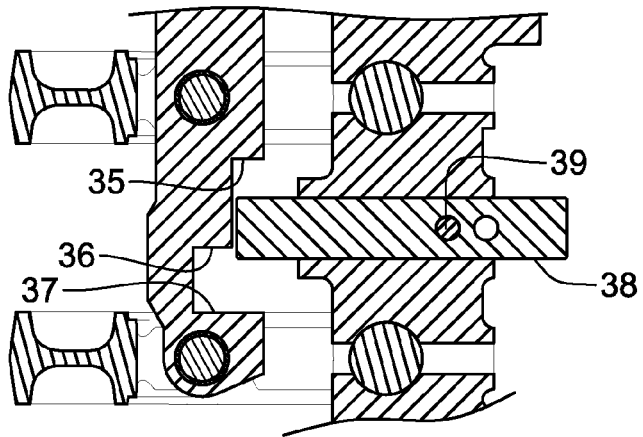
FIGS. 12a, 12b and 12c are enlarged cross-sections taken along line 12-12 in FIG. 11 with the linkage that carries the closing devices in three different positions.
Figure 12B:
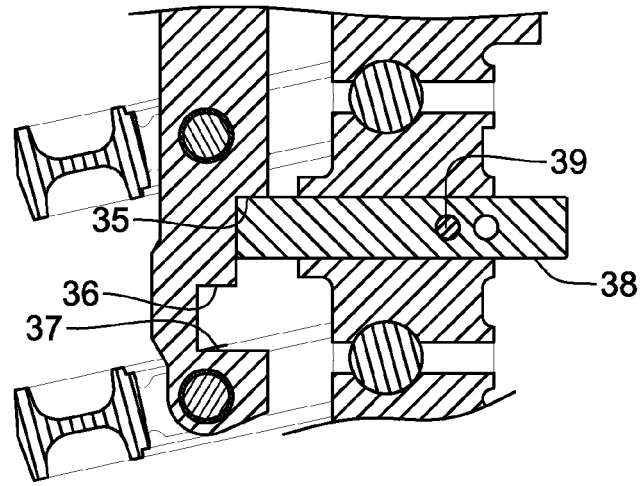
Figure 12C:
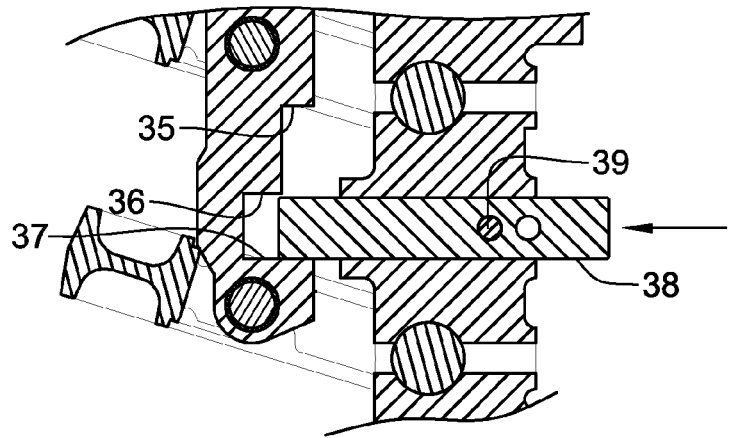

Referring to FIGS. 12A-12C, the cradle 32 includes a vertical plate 32a that is stepped on its leading surface to form two or more undercuts 35 and 36 and a bottom shoulder 37 for engaging a horizontal pin 38 movably mounted in the stem 32. The pin 38 can be locked in different positions by a smaller transverse pin 39 attached to a handle 39a (see FIG. 20) to facilitate manual insertion and withdrawal of the pin 39. The pin 38 has two transverse holes 37a, 37b for receiving the smaller locking pin 39 to lock the pin 38 in different positions, as can be seen in FIGS. 12a-12c. In the position shown in FIGS. 12a-12c, the pin 38 is in a retracted position where it overlaps the undercut 35 and the shoulder 37 so as to limit the range of vertical travel of the cradle 32, as depicted in FIGS. 12a and 12c. When the cradle 32 is raised to the position shown in FIG. 12c, the lower undercut 36 is slightly above the top surface of the pin 38, and thus the pin 38 can be moved to its most advanced position to lock the cradle at that elevation.

It can be seen that the stem 30 is attached to the side of the stem 23 to form an asymmetric arrangement that permits the stem 30 and cradle 32 to be accessed from the side of the row unit. This enables the operator to stand between furrows or crop rows when making adjustments, or when installing or removing different modules, in the field.

Figure 17:
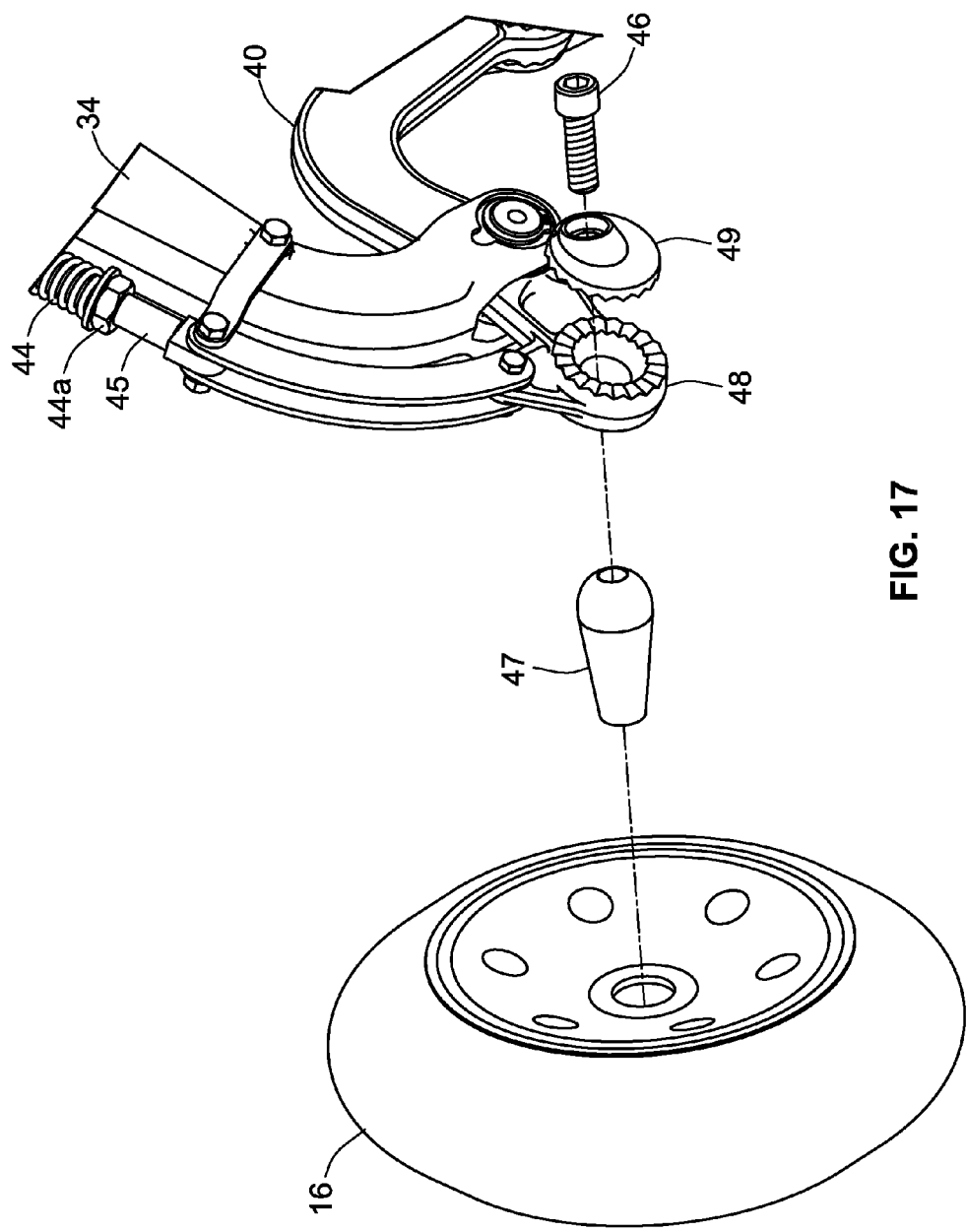
FIG. 17 is a further enlarged and exploded rear perspective view of the rear closing wheel and its mounting mechanism.

In the embodiment illustrated in FIGS. 16 and 17, the lower end of the support arm 34 is connected to an equalizer arm 40 that carries the two closing wheels 15 and 16. Specifically, the closing wheels 15 and 16 are journaled on opposite ends of the equalizer arm 40, and the lower end of the support arm 34 forms a yoke 41 that is attached to an intermediate portion of the equalizer arm 40 by a bolt 42. The location of the bolt 42 relative to the opposite ends of the equalizer arm determines how the downward pressure transmitted by the support arm 34 is proportioned between the two closing wheels 15 and 16.

Figure 4B:
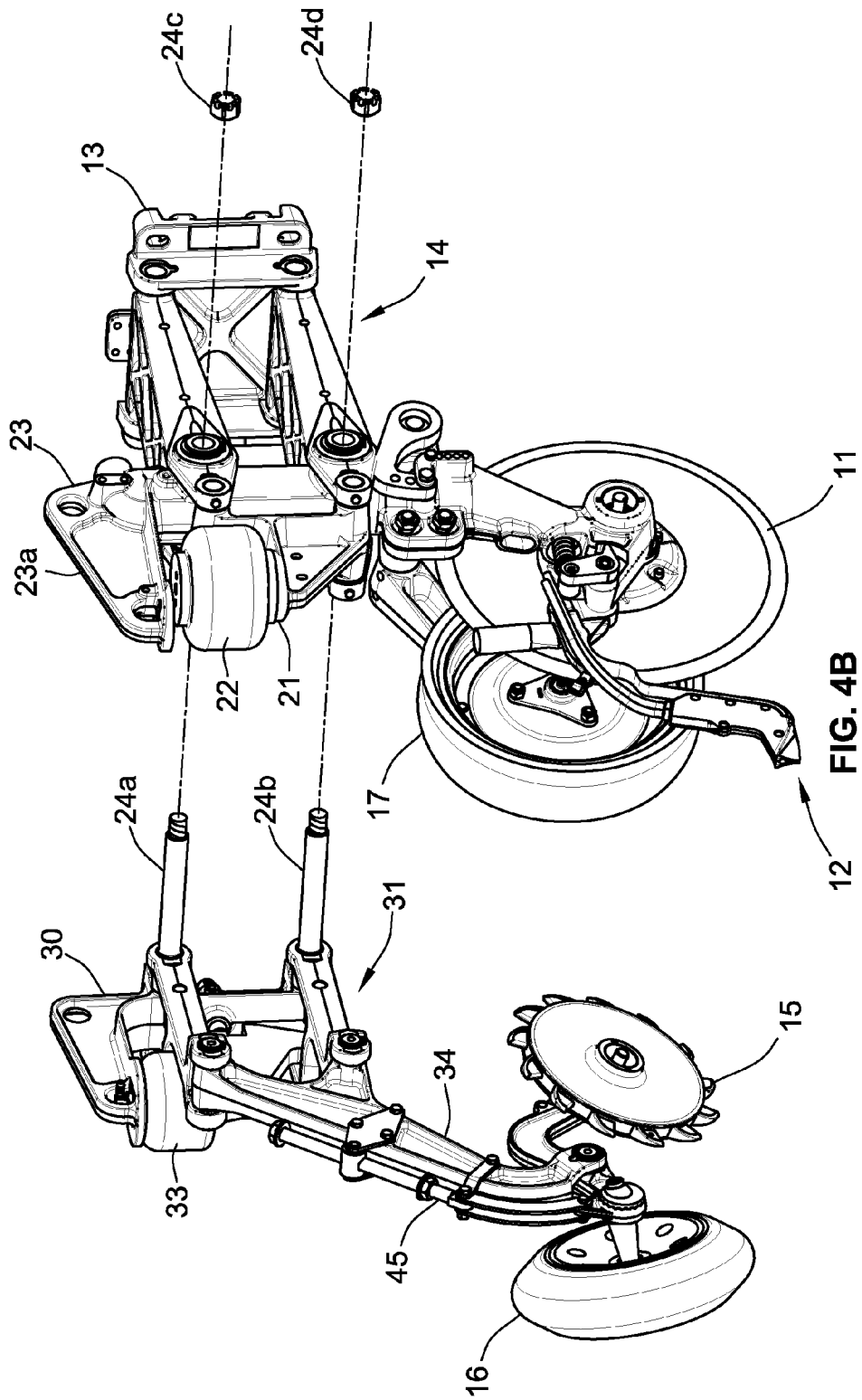
FIG. 4B is the same perspective view shown in FIG. 4A, with the closing wheel module exploded away from the main module.
Figure 4C:
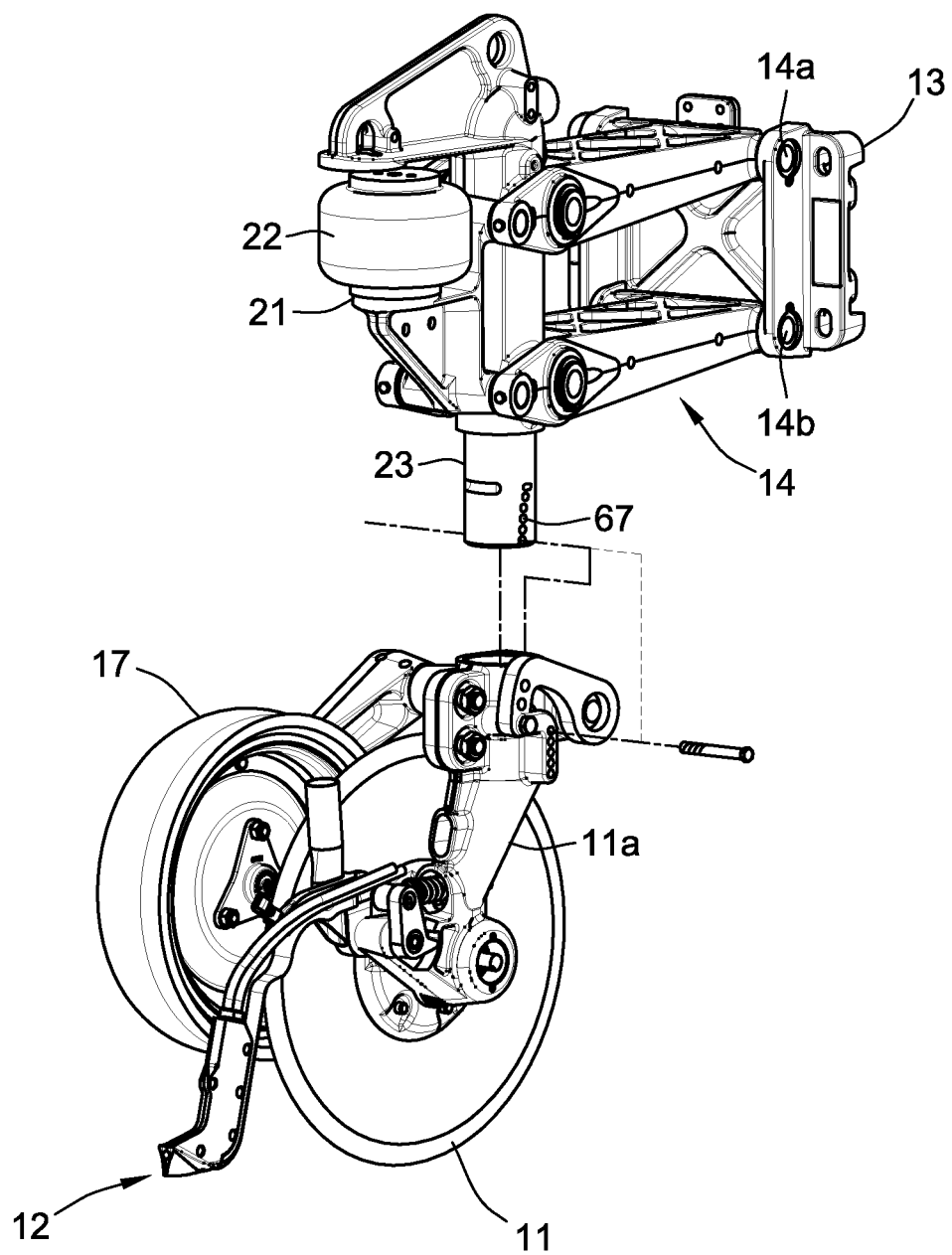
FIG. 4C is a perspective view of the main module shown in FIGS. 4A and 4B, with the upper and lower portions of that module exploded away from each other.
Figure 4D:
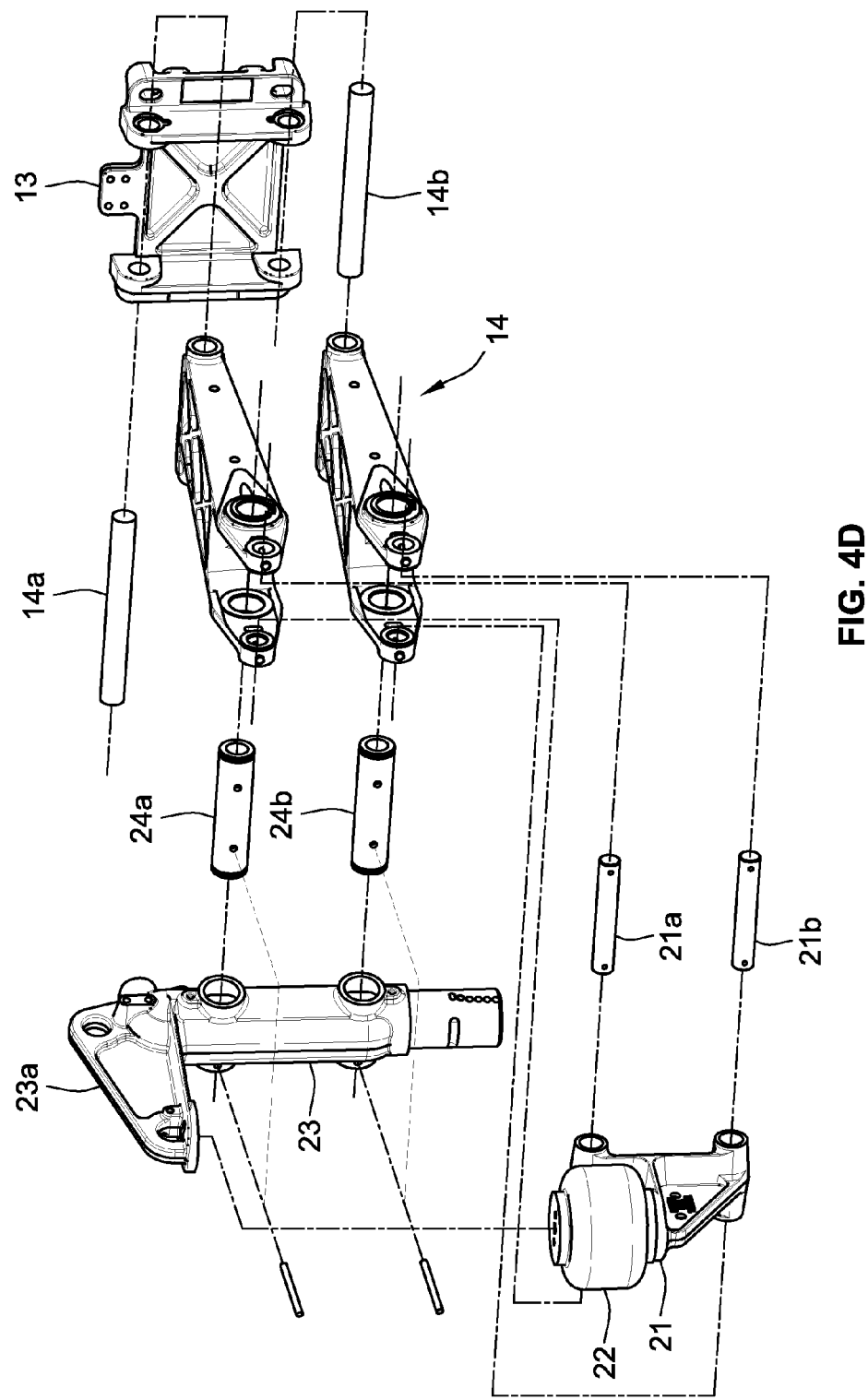
FIG. 4D is an enlarged, exploded perspective view of the portions of the main module associated with the parallel linkage in that module.
Figure 5:
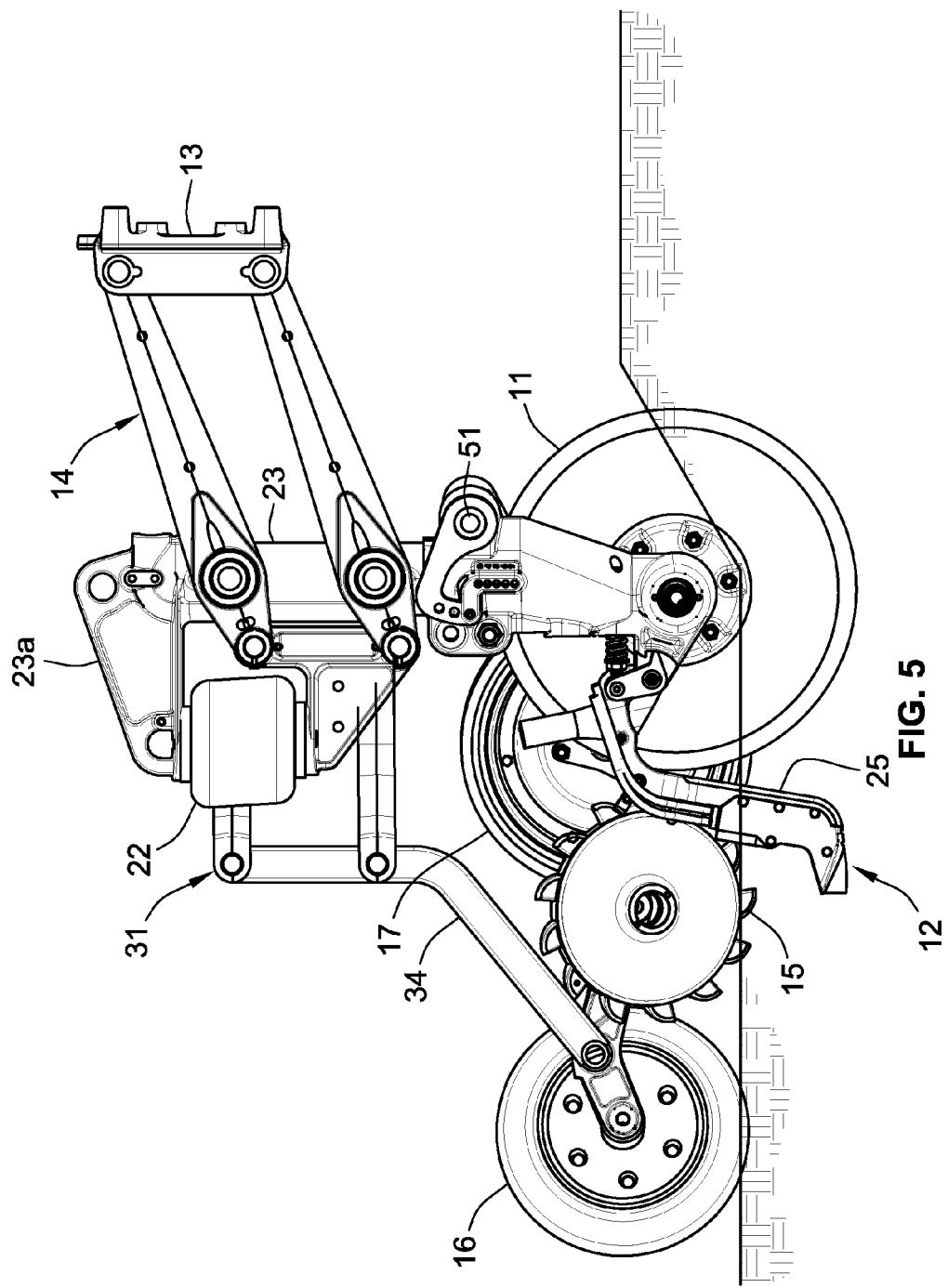
FIG. 5 is the same side elevation shown in FIG. 2 but with the linkage that connects the row unit to the towing frame tilted downwardly to move the implements carried by the row unit to a lowered position.
Figure 6:
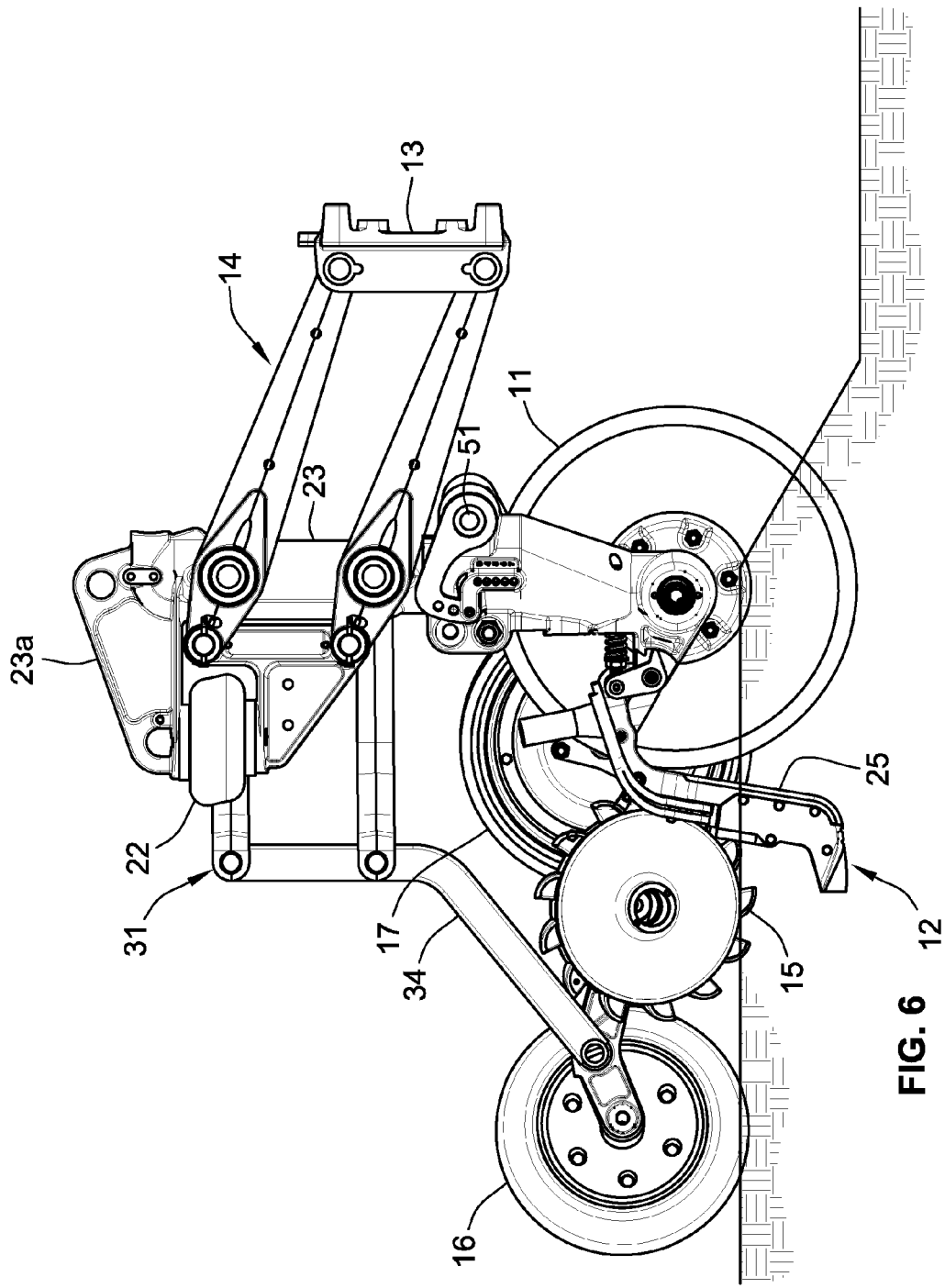
FIG. 6 is the same side elevation shown in FIG. 2 but with the linkage that connects the row unit to the towing frame tilted upwardly to move the implements carried by the row unit to a raised position.
Figure 13:
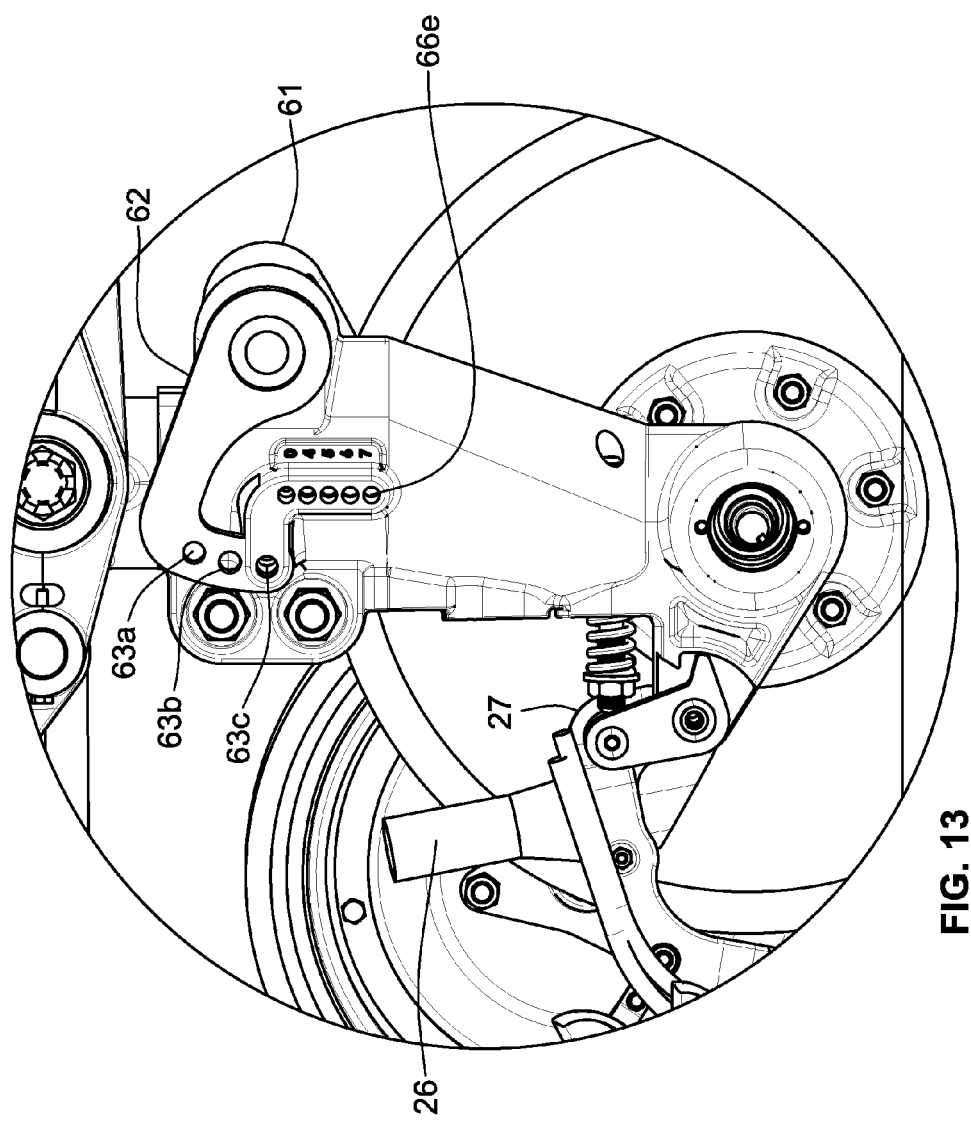
FIG. 13 is an enlargement of a central portion of the side elevation shown in FIG. 2, showing the height-adjustment mechanism for the gauge wheel and the opening device.

Referring next to FIGS. 13 through 15, the gauge wheel 17 is journaled on the end of a support arm 60 connected to one end of a horizontal shaft 61 that extends through the stem 23. The other end of the shaft 61 is connected to an adjustment arm 62 that can be pivoted to align any of three holes 63a-63c with a mating hole in the stem 23, so that a bolt 64 (see FIG. 14) can be passed through the aligned hole 63a, 63b or 63c and threaded into the mating hole in the stem 23 for the purpose of setting the height of the gauge wheel 17 relative to the opening disc 11. A second bolt 65 is inserted in one of five holes 66a-66e to adjust the angle of the opener 11 relative to the longitudinal axis of the furrow. This bolt 65 fits into a corresponding one of a series of vertically spaced holes 66a-66e formed in the base of the stem 23. As can be seen in FIG. 4C, the holes 66 are located at different circumferential positions in the stem 23, so that the support arm 11a for the opener 11 must be rotated to bring the hole 66 selected for the bolt 65 into register with the hole 66 that is located at the same height as the selected hole 66.

In the embodiment depicted in FIG. 16, a pair of manually adjustable biasing springs 43 and 44 are coupled between the support arm 34 and the trailing end of the equalizer arm 40 by a rod 45 and a linkage 46, to permit further adjustments of the down pressure on the closing wheels 15 and 16. The two springs 43 and 44 can be separately adjusted by turning respective nuts 43a and 44a to increase or decrease the compression of the respective springs. Increasing the compression of the upper spring 43 increases the force pulling the rod 45, and thus the trailing end of the equalizer arm 40, upwardly; this has the effect of reducing the down pressure on the rear closing wheel 16 and increasing the down pressure on the front closing wheel 15. Increasing the compression of the lower spring 44 has the opposite effect, increasing the force pushing the rod 45, and thus the trailing end of the equalizer arm 40, downwardly; this has the effect of increasing the down pressure on the rear closing wheel 16 and decreasing the down pressure on the front closing wheel 15.

Figure 18:
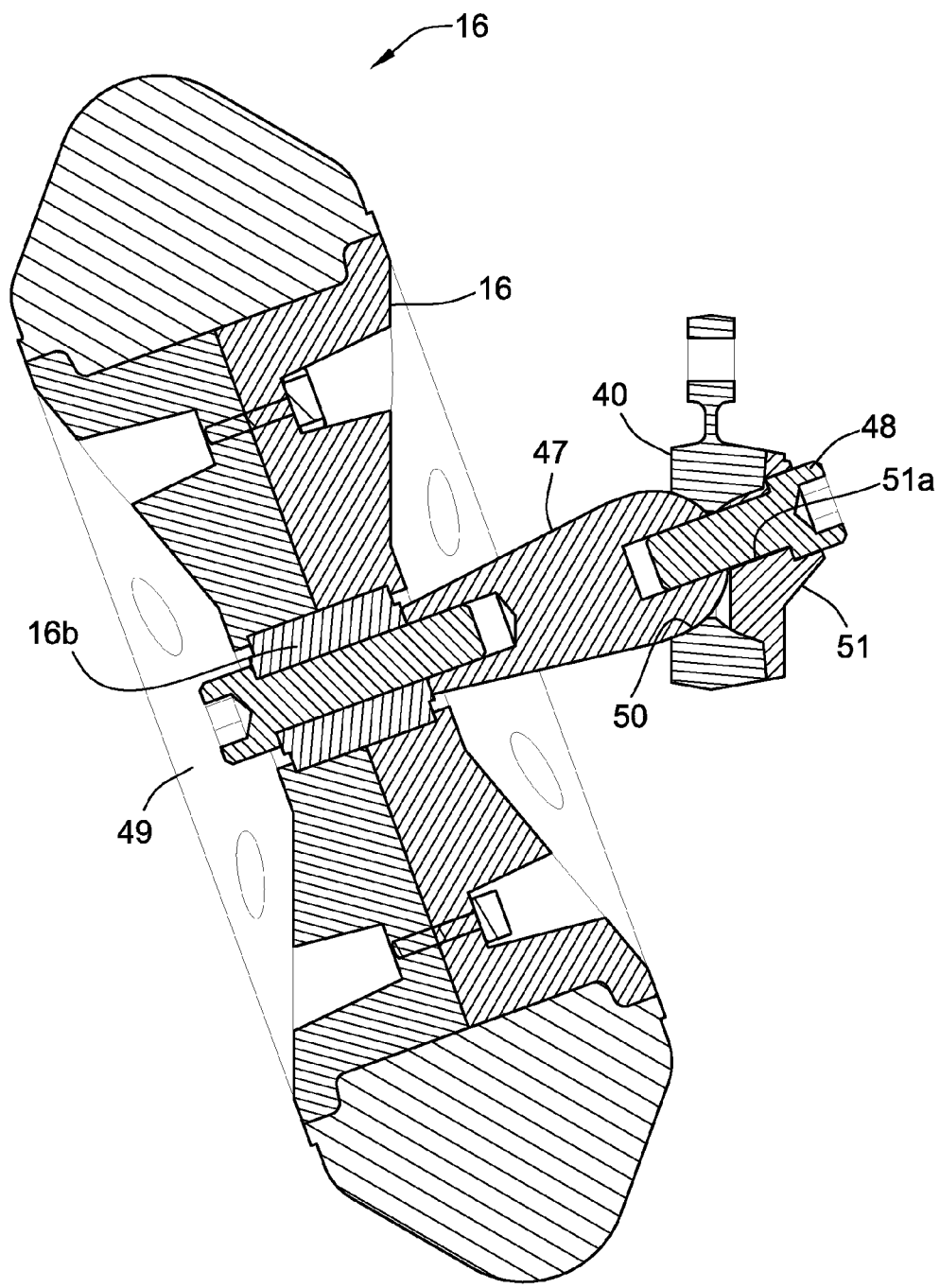
FIG. 18 is an enlarged section taken along line 18-18 in FIG. 16.

FIGS. 16-20 illustrate an adjustment mechanism provided at the trailing end of the equalizer arm 40 to permit adjustment of the angular position of the rear closing wheel 16. This closing wheel 16 includes a rim 16a and a bearing sleeve 16b attached to the equalizer arm 40 by a pair of bolts 47 and 48 threaded into opposite ends of a tapered connecting rod 49. The larger end of the rod 49 has a hemispherical shape to mate with a hemispherical recess in a socket 50 formed by the trailing end of the arm 40, thereby forming a swivel joint that permits adjustment of the angular position of the rod 49, which in turn adjusts the angular position of the closing wheel 16. As can be seen in FIG. 18, the bolt 48 passes through a hole 51a in a cap 51, and the axis of the hole 51a is neither orthogonal to the plane of the support arm 34 nor centered in the socket 50. The opposed surfaces of the cap 51 and the arm 40 are serrated (see FIGS. 16 and 17) so that the angular position of the cap 51 remains fixed when the bolt 48 is tightened to draw the cap 51 tightly against the arm 40, i.e., the interlocking teeth of the serrated surfaces prevent relative rotational movement of the cap 51 relative to the arm 40. Thus, the angular position of the closing wheel 16 can be varied over a wide range by simply adjusting the angular position of the cap 51.

Figure 19A:
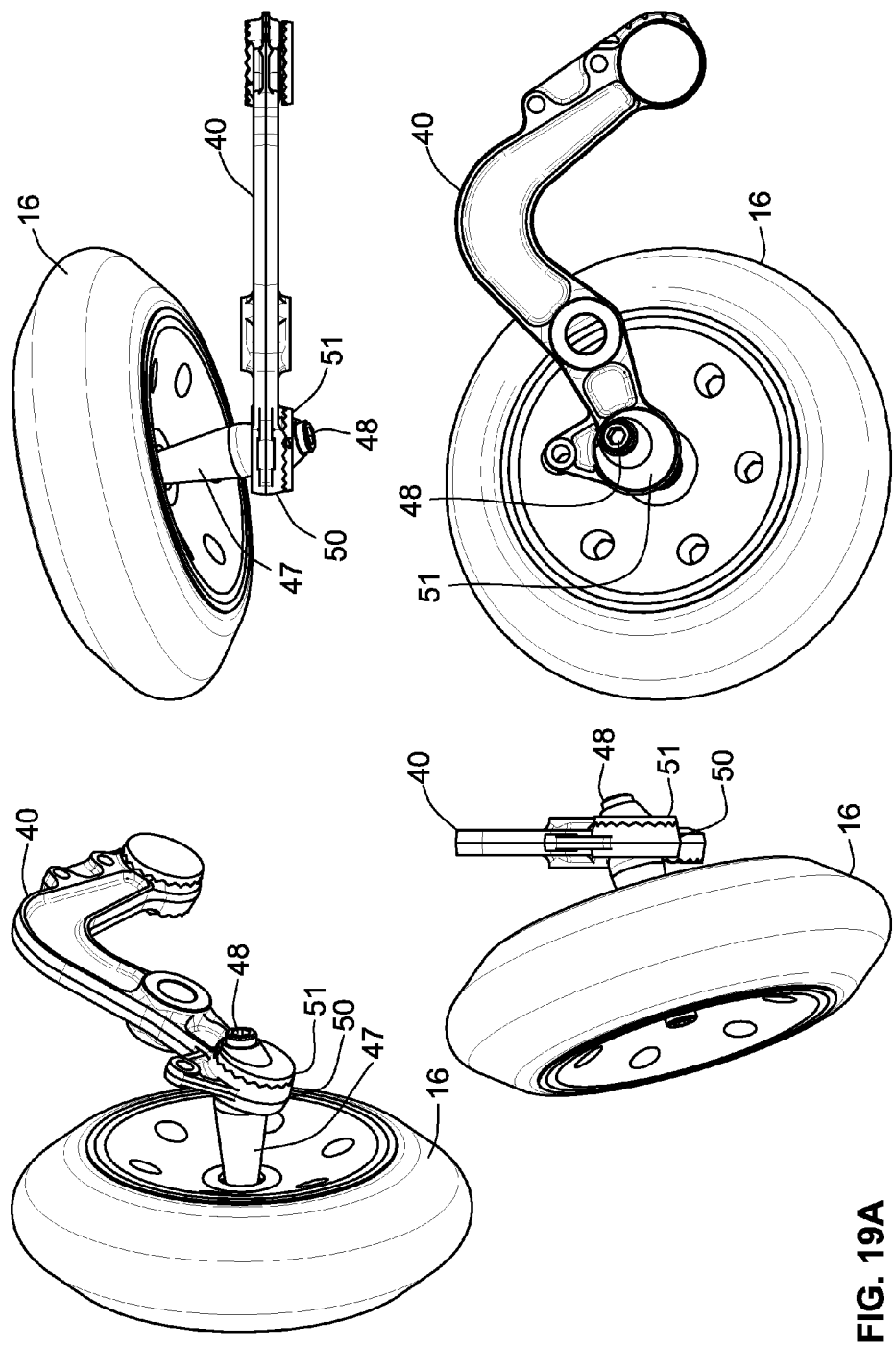
FIG. 19A is a rear perspective view, a top plan view, a rear elevation view and a side elevation view of the rear closing wheel and its mounting mechanism, with the adjustment mechanism set in a position that is offset in a clockwise direction from the 12 o'clock position.
Figure 19B:
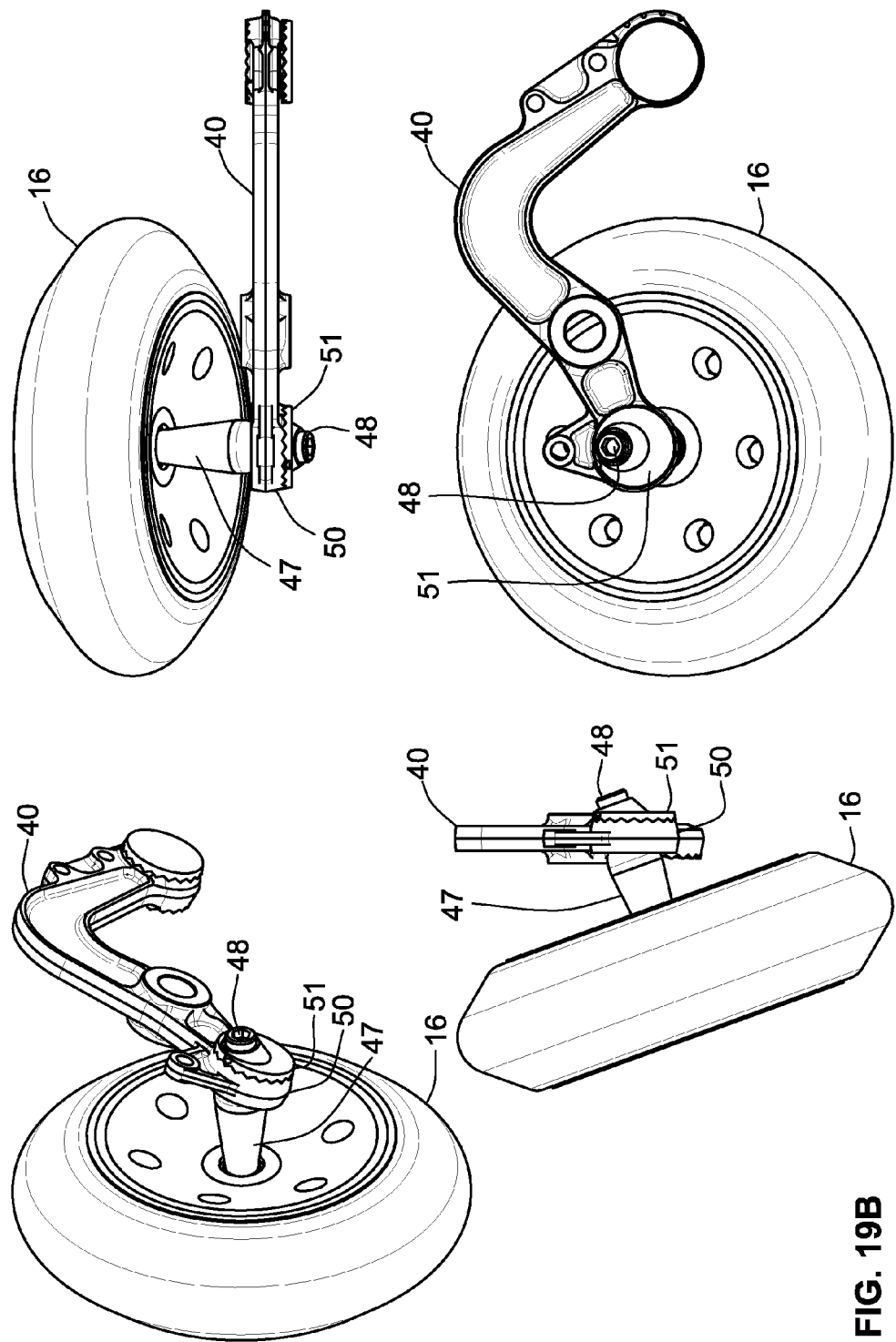
FIG. 19B is a rear perspective view, a top plan view, a rear elevation view and a side elevation view of the rear closing wheel and its mounting mechanism, with the adjustment mechanism set in the 12 o'clock position
Figure 19C:
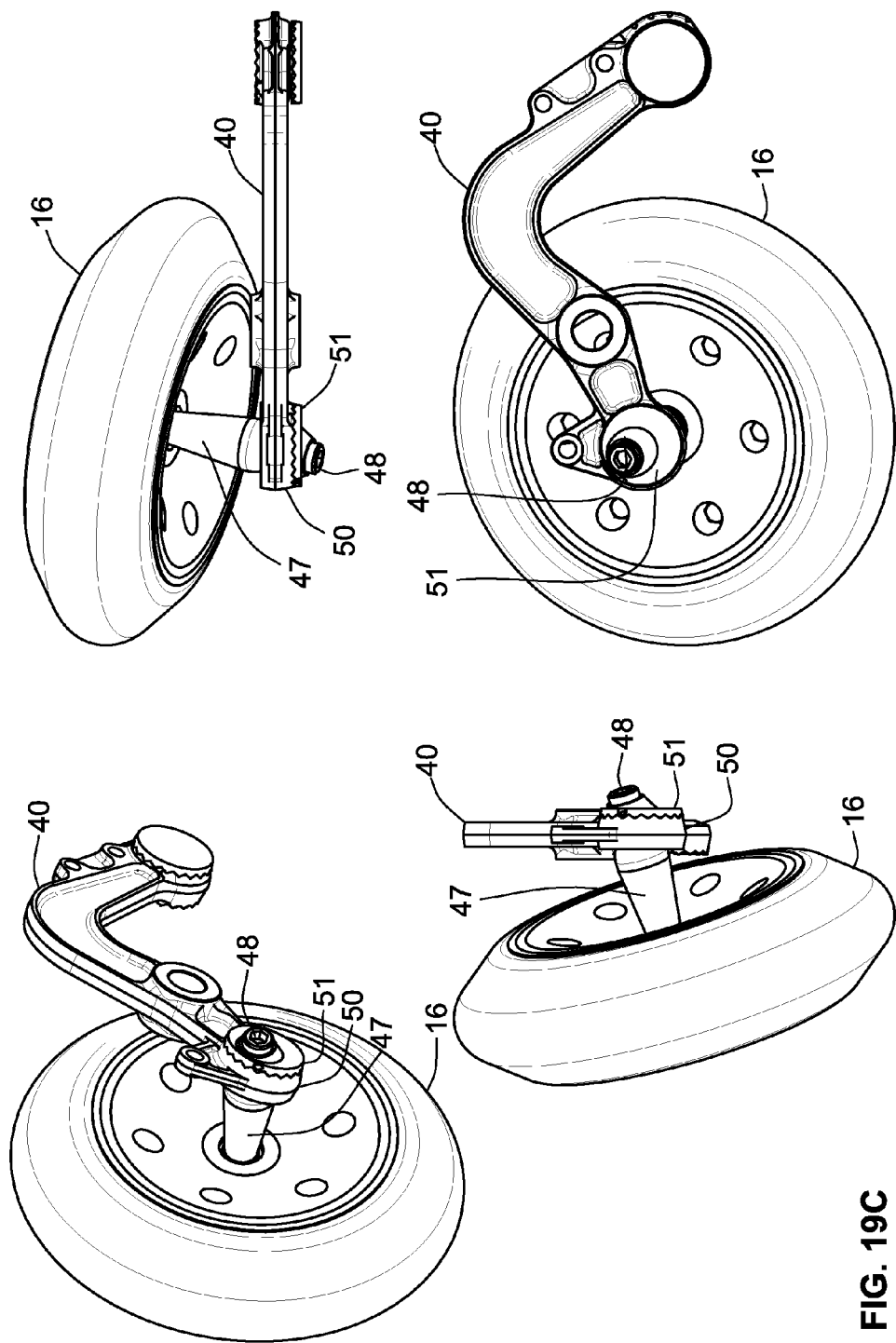
FIG. 19C is a rear perspective view, a top plan view, a rear elevation view and a side elevation view of the rear closing wheel and its mounting mechanism, with the adjustment mechanism set in a position that is offset in a counter-clockwise direction from the 12 o'clock position

FIGS. 19A-19C illustrate the rear closing wheel 16 in three different angular positions, determined by three different positions of the cap 51 relative to the swivel joint socket 50. Specifically, the cap 51 is set at a 12 o'clock position in FIG. 19b, one notch to the right of the 12 o'clock position in FIG. 19A, and one notch to the left of the 12 o'clock position in FIG. 19A. It can be seen that in FIG. 19B the top of the closing wheel 16 is tilted outwardly, in FIG. 19A both the top and the front of the wheel are tilted outwardly, and in FIG. 19C both the top and the rear of the wheel are tilted outwardly. It will be appreciated that when the cap 51 is set at a 6 o'clock position, the top of the wheel 16 will be tilted inwardly rather than outwardly, and then settings on either side of the 6 o'clock position will tilt the front of the wheel inwardly and outwardly.

Figure 20:
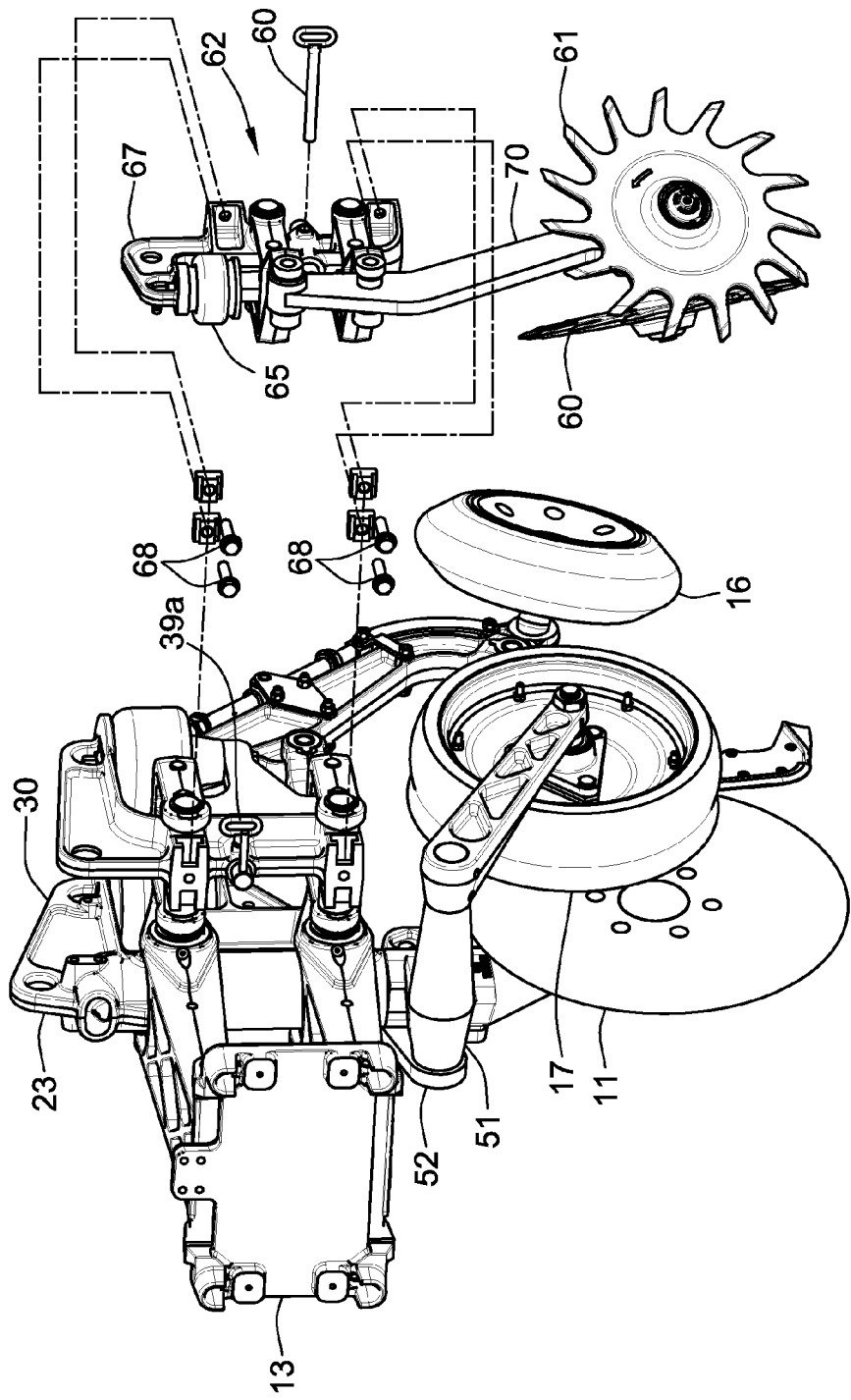
FIG. 20 is a partially exploded front perspective view of one side of a modified row unit similar to the row unit shown in FIG. 1 with the addition of a module that includes a pair of residue-clearing wheels at the front end of the unit.
Figure 21:
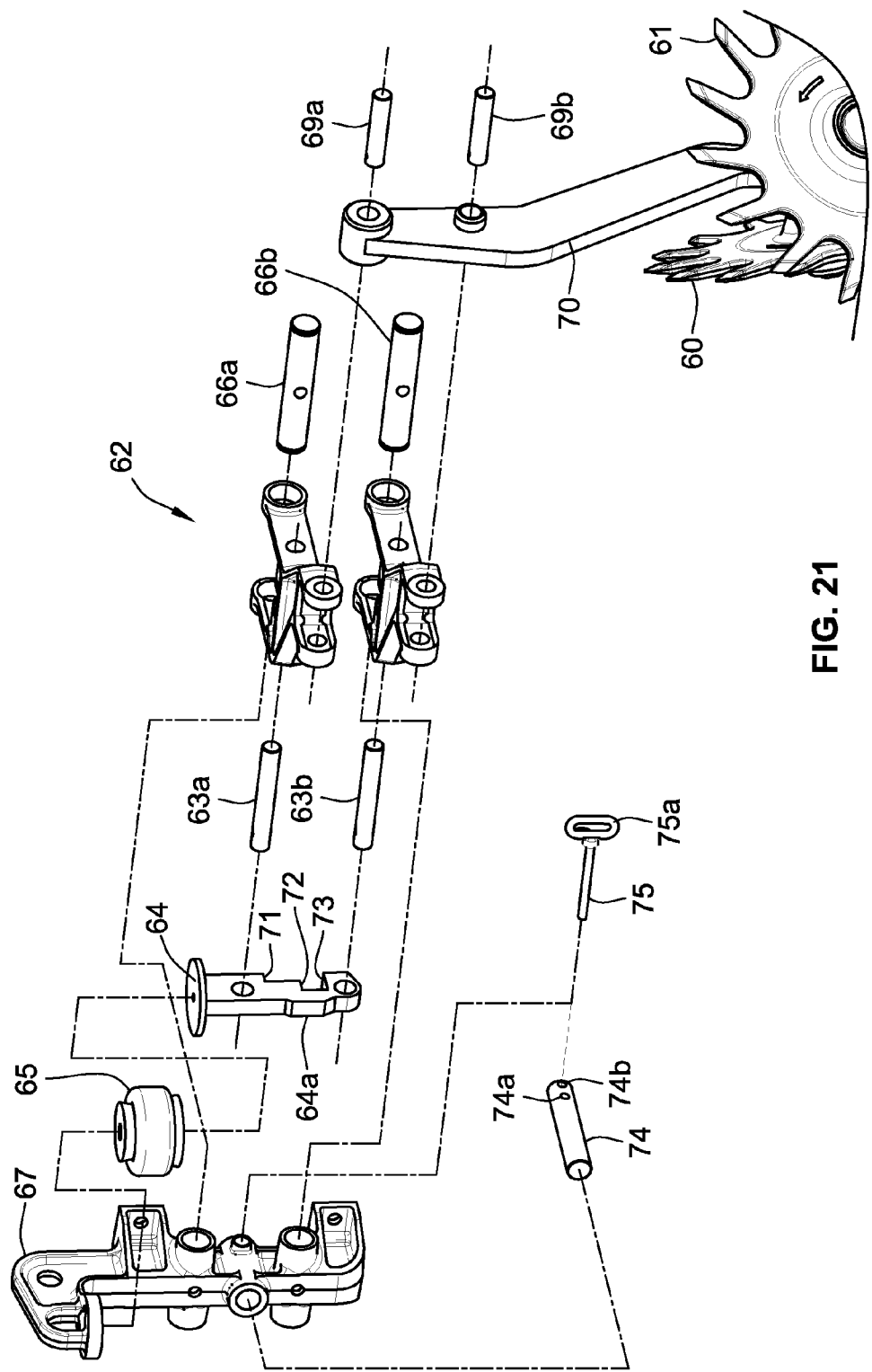
FIG. 21 is an enlarged and exploded perspective view of the residue-clearing-wheel module in the row unit shown in FIGS. 19 and 20.

FIGS. 20-21 illustrate a modified embodiment that includes a clearing wheel module comprising a pair of residue-clearing wheels 60 and 61 in front of the opening disc 11, and a third parallel linkage 62 that is pivotably connected by pins 63a, 63b to a third cradle 64 for a third air spring 65. The trailing end of the parallel linkage 62 is pivotably connected by pins 66a, 66b to a stem 67 that is bolted to the stem 30 by bolts 68. The forward end of the linkage 62 is pivotably connected by pins 69a, 69b to a support arm 70 that carries the toothed residue-clearing wheels 60 and 61. The clearing wheels 60, 61 are journaled on the ends of two stub shafts on the lower end of the support arm 70. When the air spring 65 is expanded by increasing the air pressure supplied to that spring, the downward pressure on the leading end of the third parallel linkage 62 is increased, which can (1) pivot that end of the linkage 62 downwardly around the axes of the pivotable connection between the linkage 62 and the pins 69a, 69b and/or (2) increase the downward pressure on the support arm 70 and, therefore, on the clearing wheels 60 and 61. Conversely, when the air spring 65 is contracted by reducing the air pressure supplied to that spring, the downward pressure on the leading end of the third parallel linkage 62 is reduced, which can (1) pivot that end of the linkage 62 upwardly around the axes of the pivotable connection between the linkage 62 and the pins 69a, 69b and/or (2) decrease the downward pressure on the support arm 70 and, therefore, on the clearing wheels 60 and 61. Thus, the downward pressure on the clearing wheels 60, 61 may be remotely adjusted for different soil conditions by adjusting the air pressure supplied to the air spring 65.

The cradle 64 includes a vertical plate 64a that is stepped on its leading surface to form two or more undercuts 71 and 72 and a bottom shoulder 73 for engaging a horizontal pin 74 movably mounted in the stem 67. The pin 74 can be locked in different positions by a smaller transverse pin 75 attached to a handle 75a to facilitate manual insertion and withdrawal of the pin 75. The pin 74 has two transverse holes 74a, 74b for receiving the smaller locking pin 75 to lock the pin 74 in different positions, as depicted in FIGS. 12a-12c for the pin 38. It can be seen that the stem 67 is attached to the front of the stem 30 to maintain the asymmetric arrangement that permits the stem 67 and cradle 64 to be accessed from the side of the row unit.

Figure 22:
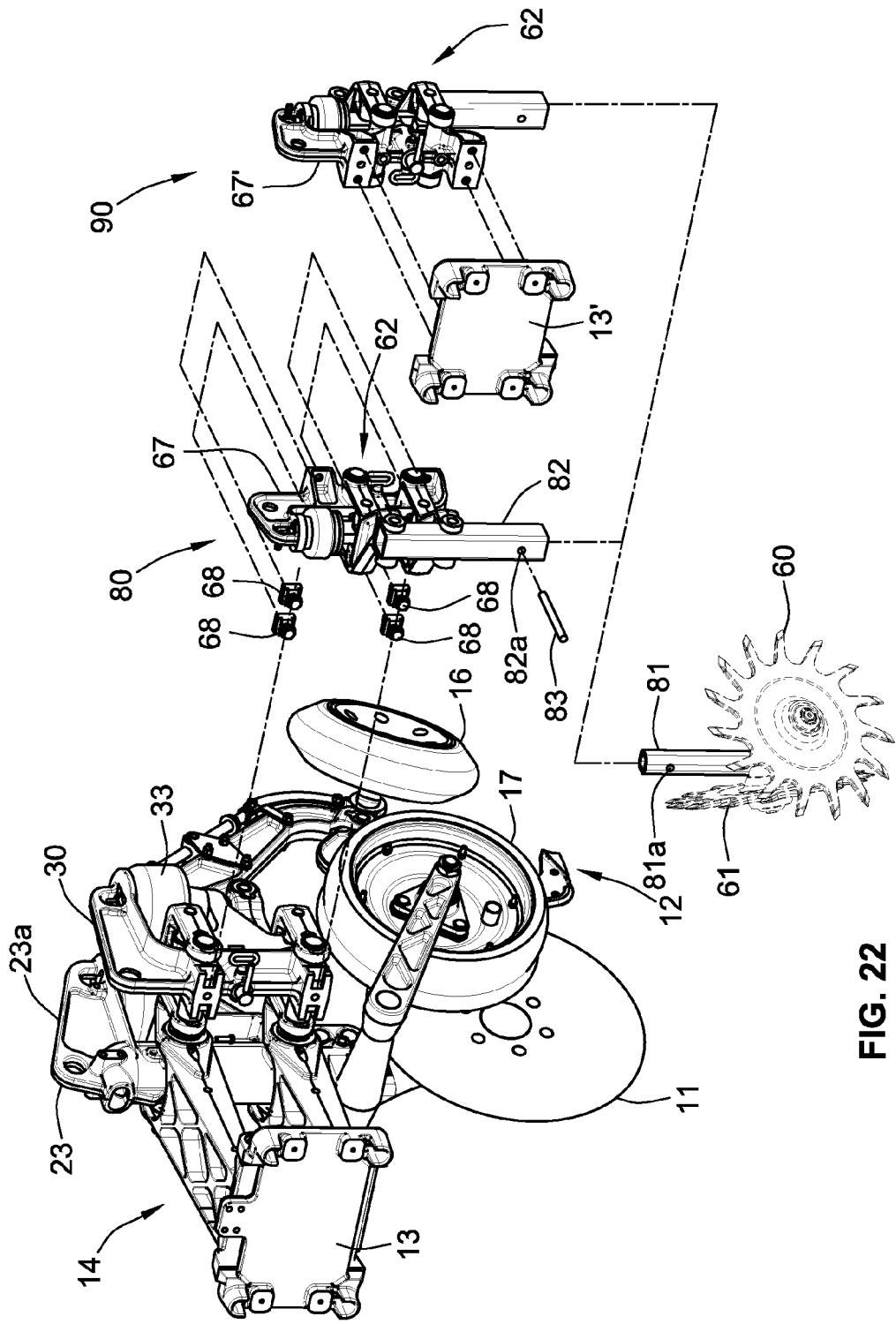
FIG. 22 is a partially exploded front perspective view of the row unit shown in FIG. 20 but with two different modified modules that can be used with residue clearing wheels or other devices.

FIG. 22 illustrates two modified clearing-wheel modules 80 and 90. In module 80, the clearing wheels 60 and 61 are carried on the lower end of a square tube 81 that telescopes upwardly into a larger square tube 82 that is pivotably coupled to the linkage 62. The two tubes 81 and 82 are locked together by a pin 83 inserted through mating holes 81a and 82a in the respective tubes 81, 82. Multiple holes may be formed in the tubes 81, 82 to permit adjustment of the vertical position of the clearing wheels 60, 61. The clearing wheels 60, 61 are shown in broken lines, because this embodiment provides a universal stem that can be used to control the down pressure on a variety of different devices. For example, different forms of wheels, discs or blades can be substituted for the clearing wheels 60, 61.

The module 90 in FIG. 22 is similar to the module 80 but rotated 180° around a vertical axis. The stem 67' is modified to be attached to a frame plate 13' adapted for connection to a conventional towing frame that is typically hitched to a tractor by a draw bar. This permits the module 90 to be used by itself, if desired.

FIG. 23 is a schematic diagram of a fluid control system for supplying pressurized air to the three sets of air springs 22a-22n, 33a-33n and 65a-65n of multiple row units 10a-10n. A source 100 of pressurized air, typically located on a tractor, supplies pressurized air via supply line 101 to three valves 102, 103, 104 that control the pressure in respective air lines 105a-105n, 106a-106n and 107a-107n leading to the three sets of air springs 22a-22n, 33a-33n and 65a-65n in each of the row units 10a-10n. The valves 102-104 are adjusted by three electrical control signals S1, S2 and S3 from a controller 108 to independently control the air pressure in each of the three sets of lines 105a-105n, 106a-106n and 107a-107n. The controller 108 receives three inputs from manual controls 109 located in the cab of the tractor to enable the operator to manually control the pressures supplied to the three sets of air springs as soil conditions vary.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention claimed is:

1. An agricultural row unit for use with a towing frame hitched to a tractor, said row unit comprising:
    an attachment frame adapted to be rigidly connected to said towing frame,
    a first parallel linkage pivotably coupled to said attachment frame and having a first pair of parallel links,
    a first movable frame pivotably coupled to said first parallel linkage to permit vertical pivoting movement of said first movable frame relative to said first parallel linkage,
    a furrow-opening device mounted on said first movable frame,
    a first biasing element pivotably attached to said first parallel linkage and coupled to said first movable frame for urging said furrow-opening device downwardly against the soil, a second parallel linkage pivotably coupled to said first movable frame and having a second pair of parallel links, a second movable frame pivotably coupled to said second parallel linkage to permit vertical pivoting movement of said second movable frame relative to said second parallel linkage, at least one furrow-closing device mounted on said second movable frame, and a second biasing element pivotably attached to said second parallel linkage and coupled to said second movable frame for urging said at least one furrow-closing device downwardly against the soil.

2. The agricultural row unit of claim 1 in which said first and second biasing elements are remotely controllable to permit adjustment of the forces produced to urge said furrow-opening and furrow-closing devices downwardly against the soil.

3. The agricultural row unit of claim 2 in which said first and second biasing elements are responsive to a controllable fluid pressure.

4. The agricultural row unit of claim 3 in which said first and second biasing elements are air springs.

5. The agricultural row unit of claim 1 in which said second movable frame includes a stop mechanism coupled to said second parallel linkage for limiting the range of pivoting movement of said second parallel linkage.

6. The agricultural row unit of claim 1 in which said at least one furrow-closing device comprises a pair of closing wheels positioned to engage the soil on opposite sides of a furrow formed by said furrow-opening device.

7. The agricultural row unit of claim 1 in which said second parallel linkage is laterally offset from said first parallel linkage.

8. The agricultural row unit of claim 1 which includes
a third linkage pivotably coupled to said second movable frame,
a third movable frame pivotably coupled to said third linkage to permit vertical pivoting movement of said third movable frame relative to said third linkage,
at least one soil-engaging device mounted on said third movable frame, and
a third biasing element pivotably attached to said third linkage and coupled to said third movable frame for urging said at least one soil-engaging device downwardly against the soil.

9. The agricultural row unit of claim 8 in which said at least one soil engaging-device comprises a pair of residue-clearing wheels.

10. The agricultural row unit of claim 8 in which said third biasing element is remotely controllable to permit adjustment of the forces produced to urge said at least one soil-engaging device downwardly against the soil.

11. The agricultural row unit of claim 1 which includes an adjustment mechanism coupled to at least one of said closing wheels for adjusting the angle of tilt of said at least one closing wheel, said adjustment mechanism comprising a closing-wheel support that includes a ball joint for adjusting the angle of the axis of rotation of said at least one closing wheel, and an adjustable locking device coupled to said ball joint for locking said ball joint in a selected position.

12. The agricultural row unit of claim 1 in which said at least one furrow-closing device includes an equalizer bar having a pair of furrow-closing wheels mounted on opposite ends of said equalizer bar, and a support arm connecting said equalizer bar to said second movable frame.

13. The agricultural row unit of claim 12 which includes manually adjustable biasing elements for applying an adjustable biasing force to one end of said equalizer bar.

14. The agricultural row unit of claim 13 in which said manually adjustable biasing elements permit independent adjustment of said biasing force in opposite directions.

15. An agricultural row unit for use with a towing frame hitched to a tractor, said row unit comprising:
an attachment frame adapted to be rigidly connected to said towing frame,
a first linkage pivotably coupled to said attachment frame,
a first movable frame pivotably coupled to said first linkage to permit vertical pivoting movement of said first movable frame relative to said first linkage,
a furrow-opening device mounted on said first movable frame,
a first biasing element pivotably attached to said first linkage and coupled to said first movable frame for urging said furrow-opening device downwardly against the soil,
a second linkage pivotably coupled to said first movable frame,
a second movable frame pivotably coupled to said second linkage to permit vertical pivoting movement of said second movable frame relative to said second linkage,
at least one furrow-closing device mounted on said second movable frame,
a second biasing element pivotably attached to said second linkage and coupled to said second movable frame for urging said at least one furrow-closing device downwardly against the soil, and
at least one remote manually operated adjustment device coupled to at least one of said first and second biasing elements for adjusting said force produced by said at least one adjustment device.

16. An agricultural row unit for use with a towing frame hitched to a tractor, said row unit comprising:
an attachment frame adapted to be rigidly connected to said towing frame,
a first linkage pivotably coupled to said attachment frame,
a first movable frame pivotably coupled to said first linkage to permit vertical pivoting movement of said first movable frame relative to said first linkage,
a furrow-opening device mounted on said first movable frame,
a first biasing element pivotably attached to said first linkage and coupled to said first movable frame for urging said furrow-opening device downwardly against the soil,
a second linkage pivotably coupled to said first movable frame,
a second movable frame pivotably coupled to said second linkage to permit vertical pivoting movement of said second movable frame relative to said second linkage, said second movable frame including a stop mechanism coupled to said second linkage for limiting the range of pivoting movement of said second linkage,
at least one furrow-closing device mounted on said second movable frame,
a second biasing element pivotably attached to said second linkage and coupled to said second movable frame for urging said at least one furrow-closing device downwardly against the soil, and
wherein said stop mechanism is movable between a limiting position for limiting the range of pivoting movement of said second linkage, and a locking position for locking said second linkage at a fixed elevation.

* * * * *